(12) United States Patent
Park et al.

(10) Patent No.: US 12,363,687 B2
(45) Date of Patent: Jul. 15, 2025

(54) METHOD AND APPARATUS FOR CONTROLLING TRANSMISSION POWER OF UE IN WIRELESS COMMUNICATION SYSTEM

(71) Applicant: Samsung Electronics Co., Ltd., Suwon-si (KR)

(72) Inventors: Sungjin Park, Suwon-si (KR); Hyunseok Ryu, Suwon-si (KR); Youngbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 17/600,559

(22) PCT Filed: Apr. 6, 2021

(86) PCT No.: PCT/KR2021/004303
§ 371 (c)(1),
(2) Date: Sep. 30, 2021

(87) PCT Pub. No.: WO2021/206429
PCT Pub. Date: Oct. 14, 2021

(65) Prior Publication Data
US 2022/0377720 A1 Nov. 24, 2022

(30) Foreign Application Priority Data
Apr. 6, 2020 (KR) .................... 10-2020-0041810

(51) Int. Cl.
*H04W 72/044* (2023.01)
*H04W 52/14* (2009.01)
(Continued)

(52) U.S. Cl.
CPC ......... *H04W 72/044* (2013.01); *H04W 52/14* (2013.01); *H04W 52/242* (2013.01); *H04W 52/28* (2013.01)

(58) Field of Classification Search
CPC . H04W 72/044; H04W 52/14; H04W 52/242; H04W 52/367; H04W 52/383;
(Continued)

(56) References Cited

U.S. PATENT DOCUMENTS

2020/0022089 A1  1/2020 Guo
2021/0185685 A1*  6/2021 Ryu ..................... H04W 72/02
(Continued)

FOREIGN PATENT DOCUMENTS

EP          3 855 811 A1    7/2021
KR    10-2021-0074874 A    6/2021
WO       2020/067682 A1    4/2020

OTHER PUBLICATIONS

ASUSTek, "Remaining issues on sidelink physical layer procedure on NR V2X", 3GPP TSG RAN WG1 #100, Feb. 24-Mar. 6, 2020, R1-2001017, 16 pages.
(Continued)

*Primary Examiner* — Fred A Casca

(57) ABSTRACT

The disclosure relates to a communication scheme and a system therefor which combines IoT technology and a 5G communication system for supporting a higher data transmission rate than a 4G system. The disclosure may be applied to a smart service (e.g., a smart home, a smart building, a smart city, a smart car or connected car, healthcare, digital education, retail business, a security and security related service, or the like) based on the 5G communication technology and the IoT related technology. According to an embodiment of the disclosure, there is provided a method of a sidelink reception user equipment (UE) in a
(Continued)

communication system. The method includes: receiving, from a base station, configuration information associated with power control for transmission of a physical sidelink feedback channel (PSFCH); receiving a plurality of physical sidelink shared channels (PSSCH) scheduled based on a plurality of sidelink control information (SCI); identifying at least one first PSFCH based on the number of PSFCHs scheduled in response to reception of the plurality of PSSCHs and the maximum number of PSFCHs that the first UE is capable of transmitting; in case that total transmission power for the at least one first PSFCH is greater than maximum transmission power of the first UE, identifying at least one second PSFCH in order of high priority indicated by the plurality of SCI, wherein a number of the at least one second PSFCH is the maximum number of PSFCHs which enables the sum of transmission power to be less than or equal to the maximum transmission power; identifying first transmission power for each of the at least one second PSFCH based on the number of the at least one second PSFCH; and transmitting the at least one second PSFCH based on the first transmission power.

14 Claims, 23 Drawing Sheets

(51) Int. Cl.
*H04W 52/24* (2009.01)
*H04W 52/28* (2009.01)

(58) Field of Classification Search
CPC . H04W 72/0473; H04W 76/10; H04W 76/14; H04W 76/15; H04W 76/40
See application file for complete search history.

(56) References Cited

U.S. PATENT DOCUMENTS

| | | | |
|---|---|---|---|
| 2022/0110067 A1 | 4/2022 | Ryu et al. | |
| 2022/0278797 A1* | 9/2022 | Lee | H04W 92/18 |
| 2023/0146928 A1* | 5/2023 | Hwang | H04W 52/367 |
| | | | 370/329 |

OTHER PUBLICATIONS

Supplementary European Search Report dated May 24, 2022 in connection with European Patent Application No. 21 77 3463, 7 pages.
International Search Report and Written Opinion of the International Searching Authority in connection with International Application No. PCT/KR2021/004303 issued Jul. 14, 2021, 8 pages.
LG Electronics, "Discussion on physical layer procedures for NR sidelink", 3GPP TSG RAN WG1 Meeting #100 R1-2000785, e-Meeting, Feb. 24-Mar. 6, 2020, 21 pages.
Nokia et al., "Remaining details of physical layer procedures for sidelink", 3GPP TSG-RAN WG1 Meeting #100 R1-2000387, e-Meeting, Feb. 24-Mar. 6, 2020, 9 pages.
Ericsson, "Physical layer procedures for NR sidelink", 3GPP TSG-RAN WG1 Meeting #100-e, R1-2001012, e-Meeting, Feb. 24-Mar. 6, 2020, 8 pages.
Oppo, "Remaining issues of physical layer procedure for NR V2X", 3GPP TSG RAN WG1 #100, R1-2000492, e-Meeting, Feb. 24-Mar. 6, 2020, 11 pages.
3rd Generation Partnership Project; Technical Specification Group Radio Access Network; NR; Physical layer procedures for control (Release 16), 3GPP TS 38.213 V16.6.0, Jun. 2021, 187 pages.
3rd Generation Partnership Project; Technical Specification Group Radio Access Network; NR; User Equipment (UE) radio transmission and reception; Part 1: Range 1 Standalone (Release 17) 3GPP TS 38.101-1 V17.2.0, Jun. 2021, 536 pages.
3rd Generation Partnership Project; Technical Specification Group Radio Access Network; NR; User Equipment (UE) radio transmission and reception; Part 2: Range 2 Standalone (Release 17) 3GPP TS 38.101-2 V17.2.0, Jun. 2021, 194 pages.
3rd Generation Partnership Project; Technical Specification Group Radio Access Network; NR; User Equipment (UE) radio transmission and reception; Part 3: Range 1 and Range 2 Interworking operation with other radios (Release 17) 3GPP TS 38.101-3 V17.2.0, Jun. 2021, 771 pages.
3rd Generation Partnership Project; Technical Specification Group Radio Access Network; NR; User Equipment (UE) radio transmission and reception; Part 4: Performance requirements (Release 17) 3GPP TS 38.101-4 V17.1.0, Jun. 2021, 430 pages.

* cited by examiner

METHOD AND APPARATUS FOR CONTROLLING TRANSMISSION POWER OF UE IN WIRELESS COMMUNICATION SYSTEM

CROSS-REFERENCE TO RELATED APPLICATIONS

This application is a 371 of International Application No. PCT/KR2021/004303 filed on Apr. 6, 2021, which claims priority to Korean Patent Application No. 10-2020-0041810 filed on Apr. 6, 2020, the disclosures of which are herein incorporated by reference in their entirety.

BACKGROUND

1. Field

The disclosure relates to a method and apparatus for controlling transmission power of a user equipment (UE) in a wireless communication system and, more particularly, to a method and apparatus for setting, by a UE, transmission power for a sidelink synchronization channel and a sidelink feedback channel.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Various services can be provided with the advance of wireless communication systems as described above, and accordingly there is a need for schemes to efficiently provide these services.

The disclosure provides a method and apparatus for effectively controlling transmission power of a UE in a wireless communication system.

SUMMARY

In accordance with an aspect of the disclosure, a method of a sidelink reception user equipment (RX UE) in a communication system is provided. The method may include: receiving, from a base station, configuration information associated with power control for transmission of a physical sidelink feedback channel (PSFCH); receiving a plurality of physical sidelink shared channels (PSSCHs) scheduled based on a plurality of sidelink control information (SCI); identifying at least one first PSFCH based on a number of PSFCHs scheduled in response to reception of the plurality of PSSCHs and a maximum number of PSFCHs that the first UE is capable of transmitting; in case that total transmission power for the at least one first PSFCH is greater than maximum transmission power of the first UE, identifying at least one second PSFCH in order of high priority indicated by the plurality of SCI, wherein a number of the at least one second PSFCH is a maximum number of PSFCHs which enables a sum of transmission power to be less than or equal to the maximum transmission power; identifying first transmission power for each of the at least one second PSFCH based on the number of the at least one second PSFCH; and transmitting the at least one second PSFCH based on the first transmission power.

In accordance with an aspect of the disclosure, a sidelink RX UE in a communication system is provided. The RX UE may include: a transceiver; and a controller configured to: control the transceiver to receive, from a base station, configuration information associated with power control for transmission of a physical sidelink feedback channel (PSFCH); control the transceiver to receive a plurality of physical sidelink shared channels (PSSCH) scheduled based on a plurality of sidelink control information (SCI); identify at least one first PSFCH based on a number of the PSFCHs scheduled in response to reception of the plurality of PSSCHs and a maximum number of PSFCHs that the first UE is capable of transmitting; in case that total transmission power for the at least one first PSFCH is greater than maximum transmission power of the first UE, identify at least one second PSFCH in order of high priority indicated by the plurality of SCI, wherein a number of the at least one second PSFCH is a maximum number of PSFCHs which enables a sum of transmission power to be less than or equal to the maximum transmission power; identify first transmission power for each of the at least one second PSFCH based on the number of the at least one second PSFCH; and control the transceiver to transmit the at least one second PSFCH based on the first transmission power.

According to the disclosure, a user equipment (UE) can effectively provide a service by controlling transmission power for a sidelink synchronization channel and a sidelink feedback channel in a wireless communication system.

Effects that could be obtained based on the disclosure are not limited to the above-described effects, and those skilled in the art would clearly understand other effects which are not mentioned above, based on the descriptions provided below.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1A:
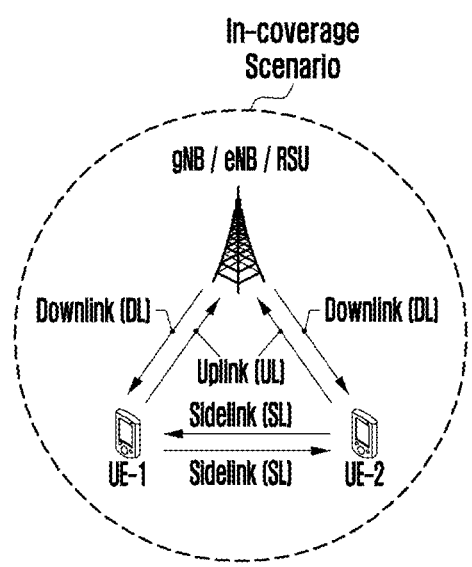
FIGS. 1A to 1D are diagrams illustrating a sidelink system according to an embodiment of the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

The detailed descriptions of the embodiments of the disclosure are provided mainly with reference to a radio access network new RAN (NR) and a packet core, which is a core network (a 5G system, a 5G core network, or an NG core: next generation core), in the 5G mobile communication standard specified by the 3GPP which is a standard organization for a mobile communication standard. However, the subject matter of the disclosure would be slightly modified without departing from the scope of the disclosure, and might be applied to other communication systems having a similar technical background. The modification and application thereof may be determined by those skilled in the art.

In the disclosure, a sidelink UE may be referred to as an NR V2X UE or an LTE V2X UE. In the disclosure, a sidelink UE may be referred to as a UE that supports device-to-device (D2D) communication. In addition, a V2X UE in the disclosure may be a vehicle that supports vehicular-to-vehicular (V2V) communication, a vehicle or a handset (i.e., a smartphone) of a pedestrian that supports a vehicular-to-pedestrian (V2P) communication, a vehicle that supports vehicular-to-network (V2N) communication, or a vehicle that supports vehicular-to-infrastructure (V2I) communication. In addition, a user equipment (UE) in the disclosure may be a road side unit (RSU) equipped with a UE function, an RSU equipped with a base station function, or an RSU equipped with part of a base station function and part of a UE function.

In addition, a sidelink transmission (TX) UE in the disclosure is a UE that transmits sidelink data and control information or a UE that receives sidelink feedback information. In addition, a sidelink reception (RX) UE is a UE that receives sidelink data and control information or a UE that transmits sidelink feedback information.

An embodiment of the disclosure provides a method and apparatus for controlling transmission power for a sidelink synchronization channel in order to improve the coverage area of a sidelink system and to minimize interference that the sidelink system causes to a cellular system.

In addition, an embodiment of the disclosure provides a method and apparatus for controlling transmission power for a sidelink feedback channel in order to improve reliability of a sidelink system and to support a high transmission rate.

In addition, an embodiment of the disclosure provides a method and apparatus for effectively providing a service in a mobile communication system.

According to an embodiment of the disclosure, based on the quality of a channel between a base station and a sidelink UE, transmission power parameters of a sidelink synchronization channel and a sidelink feedback channel may be adjusted. Through the above, in a sidelink system and the like, such as vehicle communication, device-to-device (D2D) communication, or the like, the coverage area of a sidelink synchronization signal may be improved. In addition, the reliability and transmission rate of sidelink feedback information may be improved. In addition, the amount of interference that a sidelink system causes to a cellular system may be reduced. Therefore, an embodiment of the disclosure may support more efficient sidelink communication. In addition, a service may be effectively provided in a mobile communication system.

FIGS. 1A to 1D are diagrams illustrating a sidelink system according to an embodiment of the disclosure.

FIG. 1A is a diagram illustrating an example of the case in which all sidelink UEs (UE1 and UE2) are located in the coverage area of a base station.

Every sidelink UE may receive data and control information from the base station in a downlink (DL), or may transmit data and control information to the base station in an uplink (UL). In this instance, the data and control information may be data and control information for sidelink communication. Alternatively, the data and control information may be data and control information for normal cellular communication. In addition, the every sidelink UE may transmit/receive data and control information for sidelink communication in a sidelink (SL).

Figure 1B:
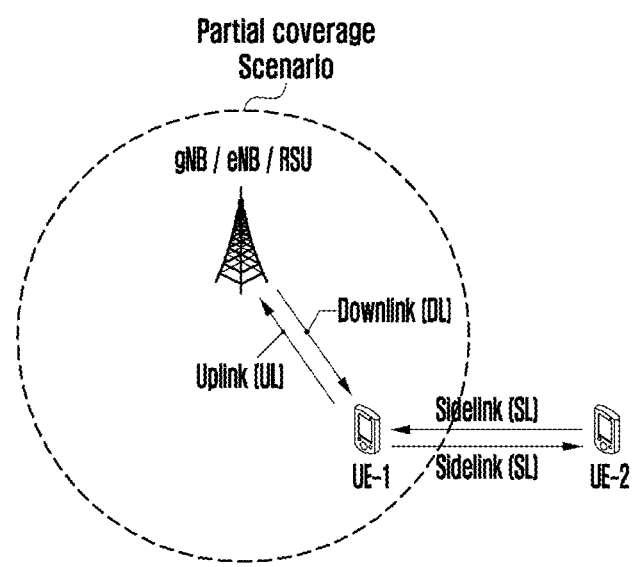

FIG. 1B is a diagram illustrating an example of the case in which UE-1 among sidelink UEs is located inside the coverage area of a base station, and UE-2 is located outside the coverage of the base station. The example of FIG. 1B may be regarded as an example associated with a partial coverage area.

UE-1 located inside the coverage area of the base station may receive data and control information from the base station in a downlink (DL), or may transmit data and control information to the base station in an uplink (UL).

UE-2 located outside the coverage area of the base station may be incapable of receiving data and control information from the base station in a downlink, and may be incapable of transmitting data and control information to the base station in an uplink.

UE2 may transmit/receive data and control information for sidelink communication in a sidelink with UE1.

Figure 1C:
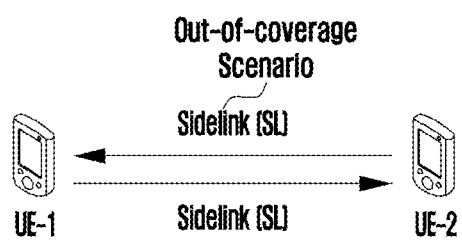

FIG. 1C is a diagram illustrating an example of the case in which all sidelink UEs are located outside the coverage area of a base station.

Therefore, UE1 and UE2 may be incapable of receiving data and control information from the base station in a downlink, and may be incapable of transmitting data and control information to the base station in an uplink.

UE1 and UE2 may transmit/receive data and control information for sidelink communication in a sidelink.

Figure 1D:
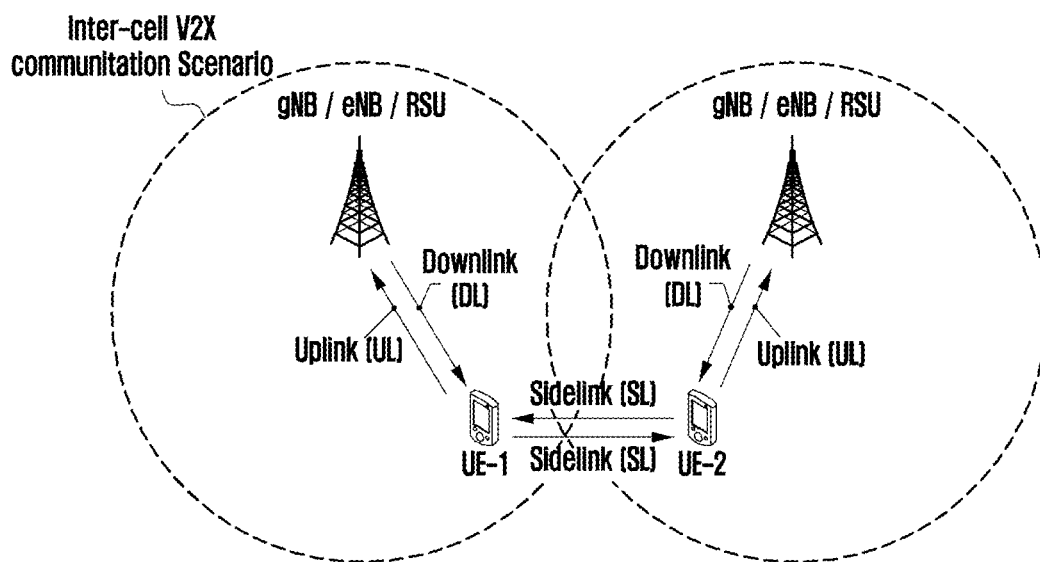

FIG. 1D is an example of a scenario in which UEs located in different cells perform sidelink communication. Particularly, it is illustrated that a sidelink transmission (TX) UE and a sidelink reception (RX) UE are in the state of accessing (RRC connected state) or in the state of camping on (RRC disconnected state, that is, RRC idle state) different base stations. In this instance, UE1 may be a sidelink TX UE, and UE2 may be a sidelink RX UE. Alternatively, UE1 may be a sidelink RX UE, and UE2 may be a sidelink TX UE. UE1 may receive a sidelink-dedicated system information block from a base station that UE1 accesses (or camps on), UE2 may receive a sidelink-dedicated SIB from another base station that UE2 accesses (or camps on). In this instance, the information associated with the sidelink-dedicated SIB that UE1 receives and the information of the sidelink-dedicated SIB that UE2 receives may be different from each other. Therefore, the information needs to be unified in order to perform sidelink communication between the UEs located in different cells.

Although FIG. 1 illustrates a sidelink system including two UEs (UE1 and UE2) for ease of description, the disclosure is not limited thereto. In addition, a uplink and a downlink between a base station and a sidelink UE may be referred to as a Uu interface, and a sidelink between sidelink UEs may be referred to as a PC5 interface. Therefore, the terms may be interchangeably used in the disclosure.

In the disclosure, a UE may be a UE that supports device-to-device (D2D) communication, a vehicle that supports vehicular-to-vehicular (V2V) communication, a vehicle or a handset (i.e., a smartphone) of a pedestrian that supports a vehicular-to-pedestrian (V2P) communication, a vehicle that supports vehicular-to-network (V2N) communication, or a vehicle that supports vehicular-to-infrastructure (V2I) communication. In addition, a UE in the disclosure may be a road side unit (RSU) equipped with a UE function, an RSU equipped with a base station function, or an RSU equipped with part of a base station function and part of a UE function.

In addition, a base station in the disclosure may be a base station that supports both sidelink communication and normal cellular communication, or may be a base station that supports only sidelink communication. In this instance, the base station may be a 5G base station (gNB), a 4G base station (eNB), or a road site unit (RSU). Therefore, unless otherwise mentioned, a base station and a RSU may be used as the identical concept and may be interchangeably used in the disclosure.

Figure 2A:
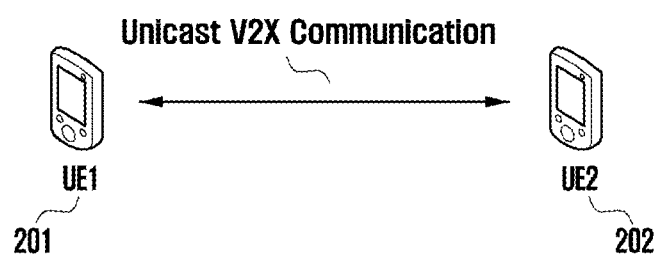
FIGS. 2A and 2B are diagrams illustrating a sidelink communication method performed via a sidelink according to an embodiment of the disclosure.
Figure 2B:
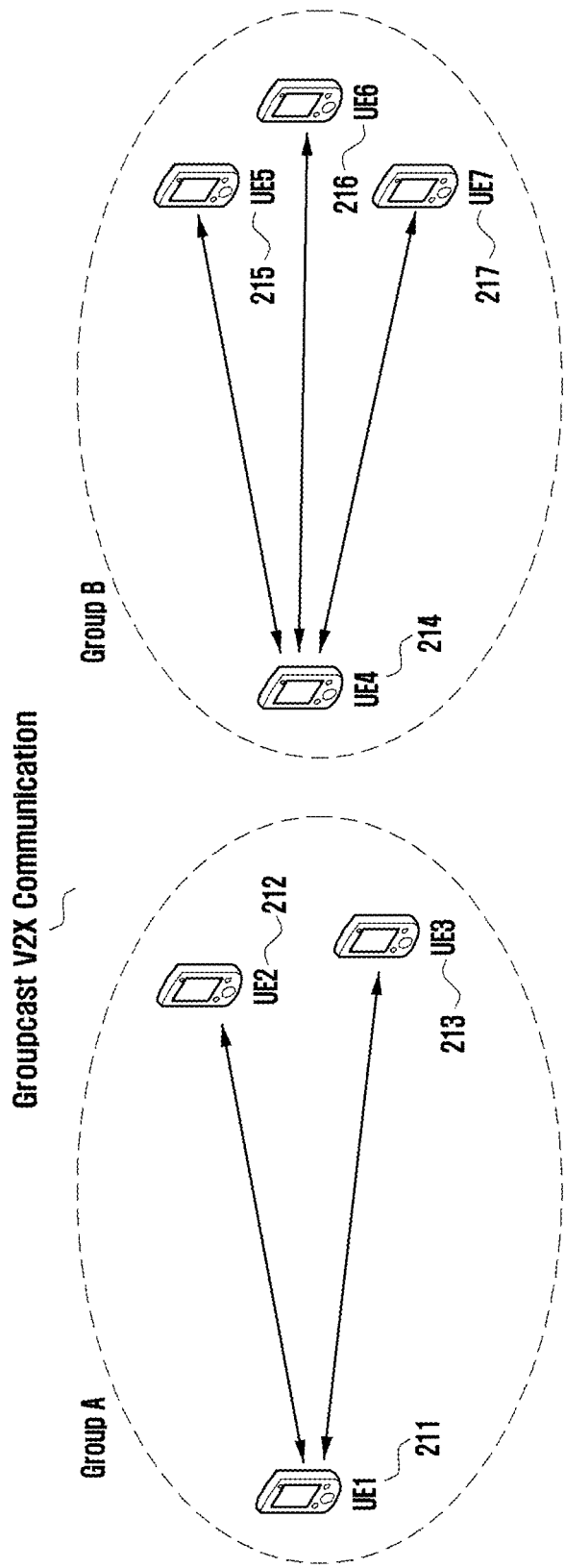

FIGS. 2A and 2B are diagrams illustrating a sidelink communication method performed via a sidelink according to an embodiment of the disclosure.

According to FIG. 2A, a transmission (TX) UE and a reception (RX) UE may perform one-to-one communication, which is referred to as unicast communication. For example, if UE-1 is a TX UE, UE-2 may be an RX UE. Alternatively, if UE-2 is a TX UE, UE-1 may be an RX UE.

According to FIG. 2B, a TX UE and an RX UEs may perform one-to-multiple communication, which may be referred to as groupcast or multicast.

FIG. 2B illustrates that UE1, UE2, and UE3 are grouped (group A) and perform groupcast communication, and UE4, UE5, UE6, and UE-7 are grouped (group B) and perform groupcast communication. Each UE performs groupcast within a group which the corresponding UE belongs to, and communication between different groups may be performed via unicast, groupcast, or broadcast communication. Although FIG. 2B illustrates that two groups are present, the disclosure is not limited thereto.

Although not illustrated in FIG. 2, sidelink UEs may perform broadcast communication. Broadcast communication may be the case in which all sidelink UEs receive data and control information transmitted from a sidelink TX UE via a sidelink. For example, in FIG. 2B, if it is assumed that UE1 is a TX UE for broadcast, all UEs (UE2, UE3, UE4, UE5, UE6, and UE7) may receive data and control information transmitted from UE1.

Figure 3:
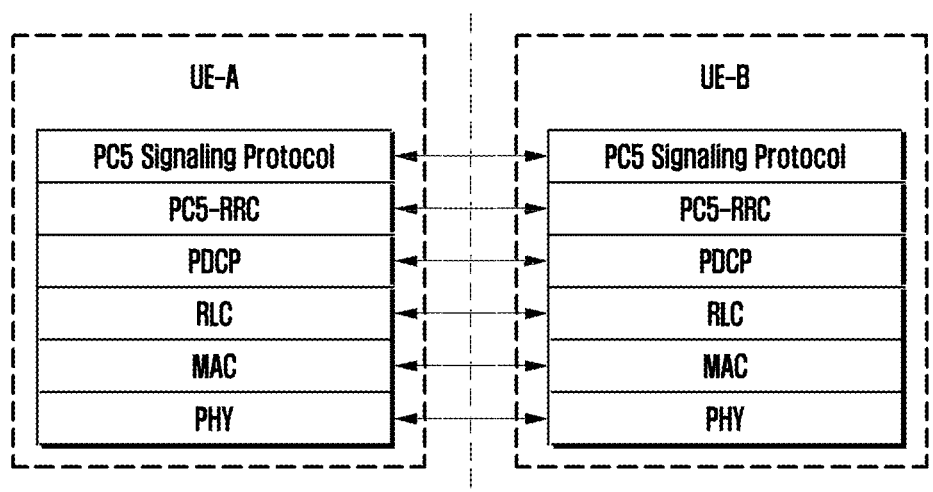
FIG. 3 is a diagram illustrating a protocol of a sidelink user equipment (UE) according to an embodiment of the disclosure.

FIG. 3 is a diagram illustrating a protocol of a sidelink UE according to an embodiment of the disclosure.

Although not illustrated in FIG. 3, application layers of UE-A and UE-B may perform a service discovery. In this instance, the service discovery may include a discovery associated with the type of sidelink communication (unicast, groupcast, or broadcast) that each UE is to perform. Therefore, it is assumed that UE-A and UE-B recognize that the UEs are to perform unicast communication via a service discovery process performed in application layers. Sidelink UEs may obtain information associated with a source identifier (ID) and a destination ID for sidelink communication, via the service discovery process.

If a service discovery process is complete, PC5 signaling protocol layers in FIG. 3 may perform direct link connection setup between the UEs. In this instance, the PC5 signaling protocol layers may exchange security configuration information for direct communication between the UEs.

If the direct link connection setup between the UEs is complete, a PC5 radio resource control (RRC) setup procedure may be performed between the UEs in the PC5 RRC layers of FIG. 3. In this instance, information associated with capability of UE-A and UE-B may be exchanged, and access stratum (AS) layer parameter information for unicast communication may be exchanged. In this instance, information associated with the capability of the UEs negotiated via PC5 RRC between the UEs may be a subset of the information used in a negotiation associated with the capability of a base station and the UEs. For example, it is assumed that a sidelink UE is capable of reporting, to the base station, information A, B, C, and D associated with the capability of the sidelink UE itself. In this instance, the sidelink UE may perform a negotiation associated with part of the information via PC5 RRC.

If the PC5 RRC setup procedure is complete, UE-A and UE-B may perform unicast communication.

Although unicast communication has been described as an example in the above description, the example may be extended to groupcast communication. For example, if UE-A, UE-B, and UE-C which is not mentioned in FIG. 3 perform groupcast communication, UE-A and UE-B perform a service discovery for unicast communication, direct link setup between the UEs, and PC5 RRC setup, as described above. In addition, UE-A and UE-C may also perform a service discovery for unicast communication, direct link setup between the UEs, and PC5 RRC setup. Finally, UE-B and UE-C may perform a service discovery for unicast communication, direct link setup between the UEs, and PC5 RRC setup. That is, a PC5 RRC setup procedure for unicast communication is performed by each pair of a TX UE and an RX UE that joins in the groupcast communication, instead of a PC5 RRC setup procedure separately performed for groupcast communication.

Figure 4:
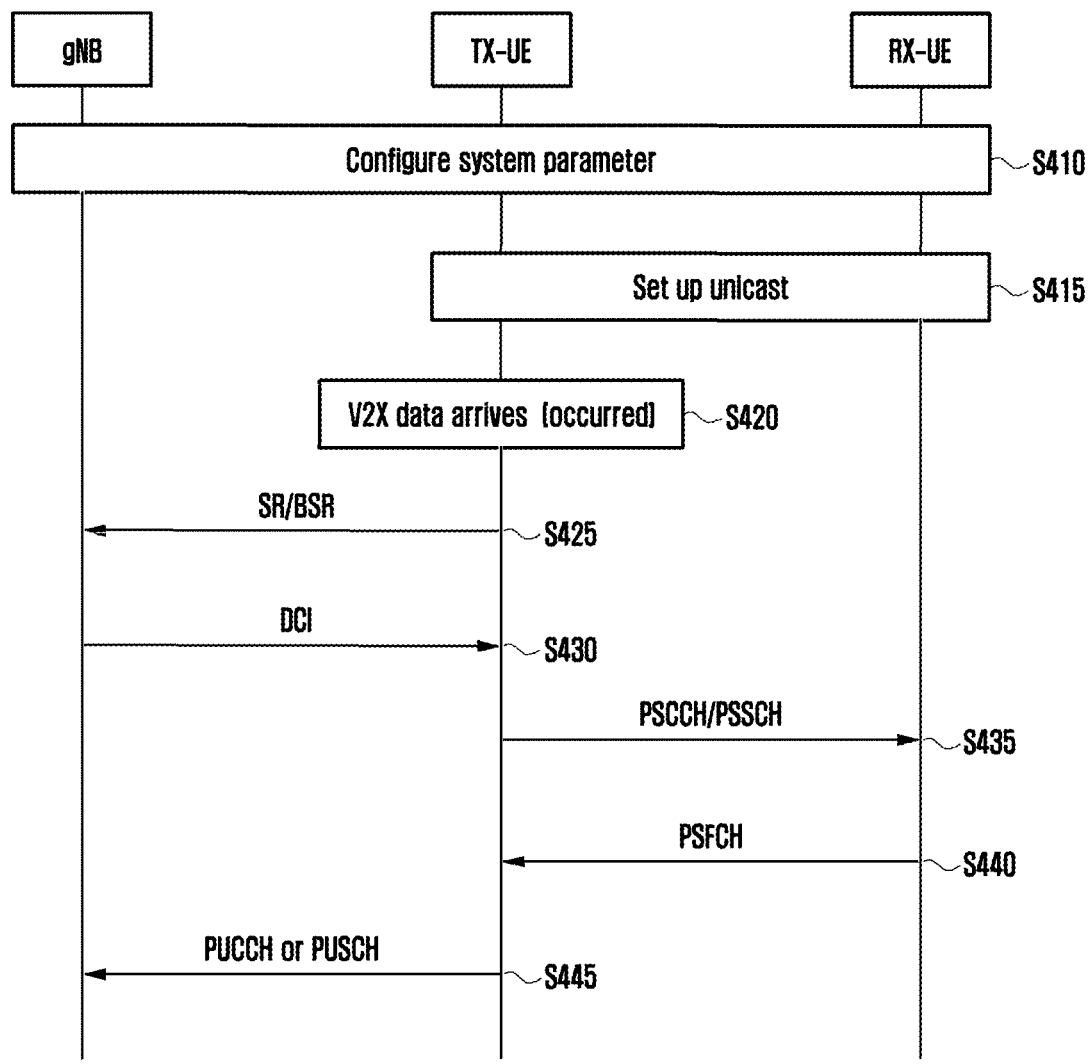
FIG. 4 is a diagram illustrating a sidelink unicast communication procedure according to an embodiment of the disclosure.

FIG. 4 is a diagram illustrating a sidelink unicast communication procedure according to an embodiment of the disclosure.

Particularly, FIG. 4 is a diagram illustrating a sidelink communication procedure based on resource allocation mode 1 which has been described in FIG. 2. In operation S410 of FIG. 4, a base station (e.g., an eNB/gNB/RSU) configure parameters for sidelink communication with respect to a TX UE and an RX UE in a cell, using system information. For example, the base station (gNB) may configure information associated with a resource pool in which sidelink communication is capable of being performed in its cell. In this instance, the resource pool may be a transmission resource pool for sidelink transmission or may be a reception resource pool for sidelink reception. A sidelink UE may be configured with information associated with one or more resource pools by the base station. The base station may perform configuration using system information so that unicast, groupcast, and broadcast communication are performed in different resource pools, respectively. For example, resource pool 1 may be used for unicast communication, resource pool 2 may be used for groupcast communication, and resource pool 3 may be used for broadcast communication. As another example, the base station may perform configuration so that unicast, groupcast, and broadcast communication are performed in an identical resource pool. As another example, the base station may configure different resource pools depending on whether a resource for a physical sidelink feedback channel used for transmitting sidelink feedback information is present in a resource pool. Particularly, resource pool 1 may be a pool in which a PSFCH resource is present, and resource pool 2 may be a pool in which a PSFCH resource is not present. In this instance, sidelink unicast which needs hybrid automatic repeat and request (HARQ) feedback and groupcast data may use resource pool 1. Sidelink unicast which does not need HARQ feedback, and groupcast data and broadcast data may use resource pool 2.

Resource pool information configured by the base station may include at least one of the following information. The information below are merely examples, and the disclosure is not limited thereto.

1. Information associated with the time resource of a resource pool: particularly, the information may include the slot index of a slot in which a physical sidelink control channel (PSCCH), a physical sidelink shared channel (PSSCH), and a physical sidelink feedback channel (PSFCH) are transmitted, or the slot index of a slot and the index of a symbol in the corresponding slot in which a PSCCH, a PSSCH, and a PSFCH are transmitted. In addition, the information may include the periodic interval of a resource in which a PSCCH, a PSSCH, and a PSFCH are transmitted.

2. Information associated with the frequency resource of a resource pool: is information associated with the frequency axis in the resource pool in which a PSCCH, a PSSCH, and a PSSCH are transmitted. Particularly, the information may include resource block indices of resource blocks in the resource pool or the index of a sub-channel including two or more resource blocks.

3. Information associated with whether a sidelink HARQ-ACK is operated may be included in resource pool configuration information.

(1) In the case in which a sidelink HARQ-ACK is operated, at least one of the following information may be included.

(1-1) The maximum number of retransmissions (1-2) HARQ-ACK timing: refers to the period of time from the point in time at which a sidelink RX UE receives sidelink control information and data information from a sidelink TX UE and to the point in time at which the sidelink RX UE transmits HARQ ACK/NACK information associated with the reception to the sidelink TX UE. In this instance, the unit of time may be a slot or one or more OFDM symbols.

(1-3) A PSFCH format or a HARQ feedback method: If two or more PSFCH formats are used, one PSFCH format may be used for transmitting 1-bit or 2-bit HARQ-ACK/NAC information. Another PSFCH format may be used for transmitting 3 or more-bit HARQ-ACK/NACK information. If the above-described HARQ-ACK/NACK information is transmitted via a PSFCH, each of ACK information and NACK information may be transmitted via a PSFCH. In this instance, if a sidelink RX UE successfully decodes a PSSCH transmitted from a sidelink TX UE, the sidelink RX UE may transmit ACK via a PSFCH. If decoding fails, the sidelink RX UE may transmit a NACK via a PSFCH. As another example, if a sidelink RX UE successfully decodes a PSSCH transmitted from a sidelink TX UE, the sidelink RX UE may not transmit an ACK, and only if decoding fails, the sidelink RX UE may transmit a NACK via a PSFCH. Unlike the above, if a single PSFCH format is used, information associated with the HARQ feedback method (whether each of ACK information and NACK information is to be transmitted via a PSFCH or whether only NACK information is transmitted via a PSFCH) may be included.

(1-4) Time/frequency/code resources or a resource set of a PSFCH: a time resource may include a slot index or a symbol index and a periodic interval associated with transmission of a PSFCH. A frequency resource may include a resource block (RB) or the start point and the end point (or the start point and the length of the frequency resource) of a sub-channel including two or more consecutive blocks where a PSFCH is transmitted.

4. Information associated with whether blind retransmission is used may be included in resource pool configuration information.

Unlike HARQ-ACK/NACK-based retransmission, blind retransmission is a process in which a TX UE does not receive feedback information associated with an ACK or NACK from an RX UE, but the TX UE repeatedly performs transmission. If blind retransmission is used, the number of times that blind retransmission is performed may be included in the resource pool information. For example, if the number of blind retransmissions is set to 4, the TX UE may always transmit the same information four times when transmitting a PSCCH/PSSCH to the RX UE. In this instance, a redundancy version (RV) value may be included in sidelink control information (SCI) transmitted via a PSCCH.

5. Information associated with a DMRS pattern which may be used in a PSSCH transmitted in the corresponding resource pool.

A DMRS pattern which may be used in a PSSCH may differ depending on the speed of a UE. For example, if the speed of the UE is high, the number of OFDM symbols used for DMRS transmission in the time axis needs to be increased in order to increase the accuracy of channel estimation. In addition, if the speed of the UE is low, the accuracy of channel estimation may be secured even though a small number of DMRS symbols are used. Accordingly, the number of OFDM symbols used for DMRS transmission in the time axis needs to be decreased in order to reduce DMRS overhead. Therefore, the resource pool information may include information associated with a DMRS pattern which may be used in the corresponding resource pool. In this instance, two or more DMRS patterns may be configured for a single resource pool, and a sidelink TX UE may select and use one of the configured DMRS patterns based on the speed of the UE itself. In addition, the sidelink TX UE may transmit information associated with the selected DMRS pattern to a sidelink RX UE using the SCI of a PSCCH. The sidelink RX UE may receive the same, may obtain the DMRS pattern information, may perform channel estimation associated with the PSSCH, and may go through a demodulation and decoding process, so as to obtain sidelink data information.

6. Information indicating whether sidelink channel state information reference signal (CSI-RS) is used (1) In the case in which a sidelink CSI-RS is used, at least one piece of the following information may be included.

(1-1) The start point of CSI-RS transmission: indicates the start point at which a sidelink TX UE starts to transmit a CSI-RS to a sidelink RX UE. The start point may be the index of a slot in which a CSI-RS is transmitted, the index of a symbol in which a CSI-RS is transmitted, or both the indices of a slot and a symbol in which a CSI-RS is transmitted.

(1-2) CSI reporting timing: the period of time from the point in time at which a sidelink RX UE receives a CSI-RS from a sidelink TX UE, that is, from the index of a slot or the index of a symbol in the slot where reception is performed, to the point in time at which the sidelink RX UE transmits a CSI report to the sidelink TX UE, that is, to the index of a slot or the index of a symbol in the slot where the CSI report is transmitted. In this instance, the unit of time may be a slot or one or more OFDM symbols.

7. A parameter for controlling sidelink TX power (1) A sidelink pathloss estimated value may be needed in order to control sidelink transmission power. In addition, if a Uu carrier of a base station and a sidelink carrier are identical, sidelink transmission power control may be performed based on a downlink pathloss estimated value in order to reduce interference that sidelink transmission causes to an uplink signal received by the reception end of the base station. To this end, the base station may perform configuration in association with whether the TX UE needs to set a sidelink transmission power value based on a sidelink pathloss estimated value, based on a downlink pathloss estimated value, or based on both the sidelink pathloss estimated value and the downlink pathloss estimated value. For example, if the base station configures an SSB or a downlink CSI-RS as a signal to be used for estimating a pathloss, the UE may set a sidelink transmission power value based on a downlink pathloss value. If the base station configures a sidelink demodulation reference signal (DMRS) or a sidelink CSI-RS as a signal to be used for estimating a pathloss, the UE may set a sidelink transmission power value based on a sidelink pathloss value.

(2) As described above, depending on a signal which is used for pathloss estimation, transmission power parameters configured for the UE may differ.

Although it is described that the above-described information is included in the resource pool configuration for sidelink communication, the disclosure is not limited thereto. That is, the above-described information may be configured for a sidelink TX UE or a sidelink TX UE, independently from a resource pool configuration.

As illustrated in FIG. 4, if the sidelink TX UE has data to transmit to the sidelink RX UE in operation S420, the sidelink TX UE may request a sidelink resource for transmission to the sidelink RX UE using a scheduling request (SR) or/and buffer status report (BSR) in operation S425. The base station that receives the BSR may identify that the sidelink TX UE has data for sidelink transmission, and may determine a resource needed for sidelink transmission based on the BSR.

According to an embodiment, the base station may transmit a sidelink scheduling grant including at least one from among resource information for sidelink control information (SCI) transmission, resource information for sidelink data transmission, and resource information for sidelink feedback transmission, to the sidelink TX UE in operation S430. The sidelink scheduling grant may be information that grants dynamic scheduling in a sidelink, and may be downlink control information (DCI) transmitted on a physical downlink control channel (PDCCH). If the base station is an NR base station, the sidelink schedule grant may include at least one from among information indicating a bandwidth part (BWP) in which sidelink transmission is performed and a carrier indicator field (CIF) in which sidelink transmission is performed or a carrier frequency indicator. If the base station is an LTE base station, only a CIF may be included. In addition, the sidelink schedule grant may further include feedback information associated with sidelink data, that is, information related to resource allocation of a PSFCH that transmits ACK/NACK information. If sidelink transmission corresponds to groupcast, the resource allocation information may include information for allocating a plurality of PSFCH resources for a plurality of UEs in a group. In addition, the information related to resource allocation for feedback information may be information indicating at least one of a plurality of feedback information resource candidate sets configured via higher layer signaling.

According to an embodiment, the sidelink TX UE that receives the sidelink scheduling grant may transmit SCI which schedules sidelink data according to the sidelink scheduling grant to the sidelink RX UE via a physical sidelink control channel (PSCCH), and may transmit the sidelink data via a physical sidelink shared channel (PSSCH) in operation S435. The SCI may include at least one piece of information among resource allocation information used for sidelink data transmission, modulation and coding scheme (MCS) information applied to sidelink data, group destination ID information, source ID information, unicast destination ID information, power control information for controlling sidelink power, timing advance (TA) information, DMRS configuration information for sidelink transmission, and information related to repetitive packet transmission, for example, information associated with the number of times that repetitive packet transmission is performed and information related to resource allocation when repetitive packet transmission is performed), a redundancy version (RV), and a HARQ process ID. In addition, the SCI may further include feedback information associated with the sidelink data, that is, information indicating a resource in which ACK/NACK information is transmitted. In addition, the SCI may include information associated with priority of a corresponding packet.

According to an embodiment, the sidelink RX UE that receives the SCI may receive sidelink data. Subsequently, the sidelink RX UE may transmit ACK/NACK information indicating whether decoding of the sidelink data is successfully performed or fails to the sidelink TX UE via a physical sidelink feedback channel (PSFCH) in operation S440. The feedback information transmission associated with a sidelink may be applied to unicast transmission or groupcast transmission, but broadcast transmission may not be excluded. If the sidelink transmission corresponds to groupcast transmission, UEs that receive groupcast data may transmit feedback information using different PSFCH resources. Alternatively, each UE that resource groupcast data may transmit feedback information using an identical PSFCH resource. In this instance, feedback may be performed using only NACK information. That is, in the case of ACK, the UE that receives the data may not perform feedback. In this instance, the PSFCH resource may include a resource identified using a code such as a scrambling code, an orthogonal cover code, or the like; and a resource identified using different sequences or a cyclic shift applied to a sequence, in addition to a resource identified in the time and/or frequency domain.

According to an embodiment, the base station may perform configuration via system information or RRC so that the sidelink TX UE reports a HARQ feedback received from the sidelink RX UE. In this instance, the sidelink TX UE may transmit the sidelink HARQ feedback received from the sidelink RX UE to the base station via a physical uplink control channel (PUCCH) or a physical uplink shared channel (PUSCH) in operation S445. In addition, the base station may perform configuration in association with whether to enable the sidelink TX UE to multiplex the sidelink HARQ feedback information received from the sidelink RX UE and uplink control information (UCI) associated with an existing Uu, and to transmit the same.

According to an embodiment, in the case in which the base station does not perform configuration associated with multiplexing the sidelink HARQ feedback information and UCI information, the sidelink TX UE may not multiplex the sidelink HARQ feedback information and uplink control information (UCI) associated with the Uu, and may not transmit the information via a single PUCCH. In this instance, the base station may configure a PUCCH for transmitting the sidelink HARQ feedback information and a PUCCH for transmitting UCI information, independently. That is, a PUCCH via which the sidelink HARQ feedback information is transmitted may be present independently, and the any UCI information may not be transmitted via the corresponding PUCCH.

Unlike the above, if the base station performs configuration so that the sidelink HARQ feedback information and the UCI information are multiplexed, the sidelink TX UE may multiplex the sidelink HARQ feedback information and the UCI information and may transmit the multiplexed information via a single PUCCH. If it is assumed that sidelink HARQ feedback information is N1 bits and UCI information is N2 bits, the order of multiplexing the information may comply with N2+N1 (that is, the sidelink HARQ feedback information is multiplexed after the UCI information). If a code rate associated with the sum of the sidelink HARQ feedback bits and the UCI bits which are multiplexed and transmitted via the corresponding PUCCH is greater than a code rate set by the base station, the sidelink TX UE may abandon transmission of the sidelink HARQ feedback information (i.e., drop the sidelink HARQ feedback information).

FIG. 4 assumes a scenario in which the sidelink TX UE is in the state of having an uplink connection to the base station (i.e., RRC connected state), and both the sidelink TX UE and the sidelink RX UE are present in the coverage area of the base station. Although not illustrated in FIG. 4, if the sidelink TX UE does not set up an uplink connection to the base station (i.e., an RRC idle state), the sidelink TX UE may perform a random-access procedure for setting up an uplink connection to the base station. In addition, although not illustrated in FIG. 4, in a scenario in which the sidelink TX UE is present within the coverage area of the base station and the sidelink RX UE is present outside the coverage area of the base station, the sidelink RX UE may use the above-described information for sidelink communication which is preconfigured. The sidelink TX UE may be configured with the information for sidelink communication by the base station, as illustrated in FIG. 4. According to an embodiment, if both the sidelink TX UE and the sidelink RX UE are present outside the coverage area of the base station, the sidelink TX UE and the sidelink RX UE may use the above-described information for sidelink communication which is preconfigured. In this instance, the meaning of preconfiguration may include the use of a value that is contained in a UE when the UE is manufactured. Alternatively, if the sidelink TX UE or the sidelink RX UE had an experience of accessing the base station and obtaining information associated with sidelink communication via RRC configuration before, or had an experience of obtaining information associated with sidelink communication via the system information of the base station, the meaning of the preconfiguration may include the use of the latest obtained information.

In addition, although not illustrated in FIG. 4, it is assumed that the sidelink TX UE completes performing a service discovery, direct link connection setup between UEs, and PC5 RRC setup, with the sidelink RX UE via the procedure mentioned in FIG. 3, before transmitting an SR/BSR to the base station.

Figure 5:
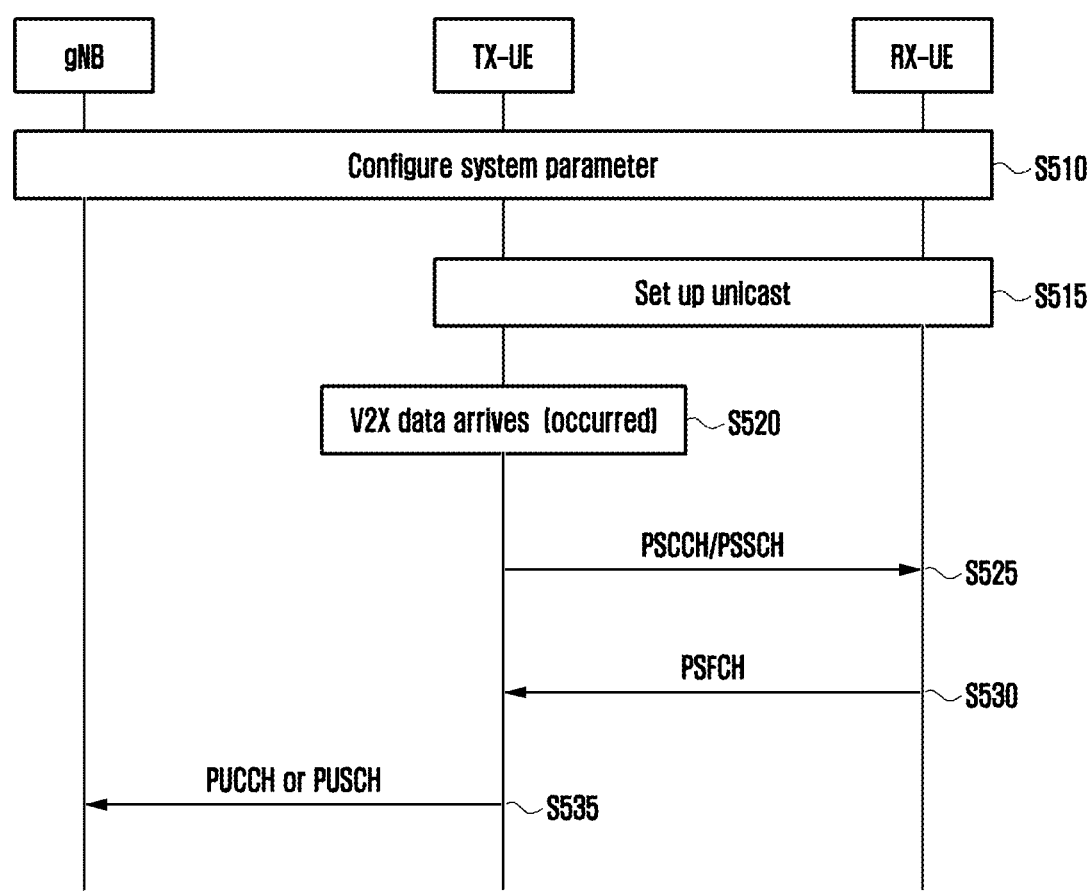
FIG. 5 is a diagram illustrating a sidelink unicast communication procedure according to an embodiment of the disclosure.

FIG. 5 is a diagram illustrating a sidelink unicast communication procedure according to an embodiment of the disclosure.

Particularly, FIG. 5 is a diagram illustrating a sidelink communication procedure based on resource allocation mode 2 which is described in FIG. 2. In FIG. 5, a base station configures a parameter for sidelink communication with respect to sidelink transmission and reception UEs in a cell via system information in operation S510. In this instance, the parameter may include at least one piece of the parameter information illustrated in FIG. 4.

As illustrated in FIG. 5, if the sidelink TX UE has data to transmit to the sidelink RX UE in operation S520, the sidelink TX UE may transmit SCI to the sidelink RX UE via a PSCCH, and may transmit sidelink data to the sidelink RX UE via a PSSCH in operation S525. According to an embodiment, the SCI may include at least one piece of information among resource allocation information used for sidelink data transmission, MCS information applied to sidelink data, group destination ID information, source ID information, unicast destination ID information, power control information for controlling sidelink power, timing advance information, DMRS configuration information for sidelink transmission, and information related to repetitive packet transmission (e.g., information associated with the number of times that repetitive packet transmission is performed and information related to resource allocation when repetitive packet transmission is performed), a redundancy version (RV), and a HARQ process ID. In addition, the SCI may include information indicating a resource in which feedback information (A/N information) associated with the sidelink data is transmitted.

According to an embodiment, the sidelink RX UE that receives the SCI may receive sidelink data. Subsequently, the sidelink RX UE may transmit ACK/NACK information indicating whether decoding of the sidelink data is successfully performed or fails to the sidelink TX UE via a PSFCH in operation S530. The feedback information transmission associated with a sidelink may be applied to unicast transmission or groupcast transmission, but broadcast transmission may not be excluded. If the sidelink transmission corresponds to groupcast transmission, UEs that receive groupcast data may transmit feedback information using different PSFCH resources. Alternatively, the UEs that receive groupcast data may transmit feedback information using an identical PSFCH resource. In this instance, only NACK information may be fed back (i.e., if a UE that receives data determines ACK, the UE does not perform feedback). In this instance, the PSFCH resource may include a resource identified using a code such as a scrambling code, an orthogonal cover code, or the like, and a resource identified using different sequences (and a cyclic shift applied to a sequence), in addition to a resource identified in the time and/or frequency domain.

As illustrated in FIG. 4, the base station in FIG. 5 may perform configuration via system information or RRC so that the sidelink TX UE reports a HARQ feedback received from the sidelink RX UE. In this instance, the sidelink TX UE may transmit the sidelink HARQ feedback received from the sidelink RX UE to the base station via a physical uplink control channel (PUCCH) or a physical uplink shared channel (PUSCH) in operation S535. In addition, the base station may perform configuration in association with whether to enable the sidelink TX UE to multiplex the sidelink HARQ feedback information received from the sidelink RX UE and uplink control information (UCI) associated with an existing Uu, and to transmit the same.

In the case in which the base station does not perform configuration associated with multiplexing the sidelink HARQ feedback information and UCI information, the sidelink TX UE may not multiplex the sidelink HARQ feedback information and uplink control information (UCI) associated with the Uu, and may not perform transmission via a single PUCCH. In this instance, the base station may independently configure a PUCCH for transmitting the sidelink HARQ feedback information and a PUCCH for transmitting UCI information. That is, a PUCCH via which the sidelink HARQ feedback information is transmitted may be present independently, and the any UCI information may not be transmitted via the corresponding PUCCH.

Unlike the above, if the base station performs configuration so that the sidelink HARQ feedback information and the UCI information are multiplexed, the sidelink TX UE may multiplex the sidelink HARQ feedback information and the UCI information and may transmit the multiplexed information via a single PUCCH. If it is assumed that sidelink HARQ feedback information is N1 bits and UCI information is N2 bits, the order of multiplexing the information may comply with N2+N1 (that is, the sidelink HARQ feedback information is multiplexed after the UCI information). If a code rate associated with the sum of the sidelink HARQ feedback bits and the UCI bits which are multiplexed and transmitted via the corresponding PUCCH is greater than a code rate set by the base station, the sidelink TX UE may abandon transmission of the sidelink HARQ feedback information (i.e., drop the sidelink HARQ feedback information).

FIG. 5 assumes a scenario in which both the sidelink TX UE and the sidelink RX UE are present in the coverage of the base station. Although not illustrated in FIG. 5, the disclosure may also be applied to the case in which both the sidelink TX UE and the sidelink RX UE are present outside the coverage area of the base station. In this instance, the sidelink TX UE and the sidelink RX UE may have information for sidelink communication which is preconfigured. In addition, although not illustrated in FIG. 5, the disclosure may also be applied to a scenario in which one of the sidelink TX UE and the sidelink RX UE is present in the coverage area of the base station and the other UE is present outside the coverage area of the base station. In this instance, information for sidelink communication for the UE inside the coverage area of the base station may be configured by the base station, and information for sidelink communication for the UE outside the coverage area of the base station may be preconfigured. In this instance, "information for sidelink communication" may be construed as information associated with at least one of the parameters for sidelink communication which have been described with reference to FIG. 4. In this instance, the meaning of preconfiguration may include the use of a value that is contained in a UE when the UE is manufactured. Alternatively, if the sidelink TX UE or the sidelink RX UE had an experience of accessing the base station and obtaining information associated with sidelink communication via RRC configuration before, or had an experience of obtaining information associated with sidelink communication via system information of the base station, the meaning of preconfiguration may include the use of the latest obtained information.

Although not illustrated in FIG. 5, it is assumed that the sidelink TX UE completes performing a service discovery, direct link setup, and PC5 RRC setup with the sidelink RX UE via the procedure mentioned in FIG. 3, before transmitting a PSCCH/PSSCH to the sidelink RX UE.

Although description is provided using unicast communication in which a single sidelink RX UE is present as an example, the disclosure may be equally applied to groupcast communication and broadcast communication in which two or more sidelink RX UEs are present.

Figure 6:
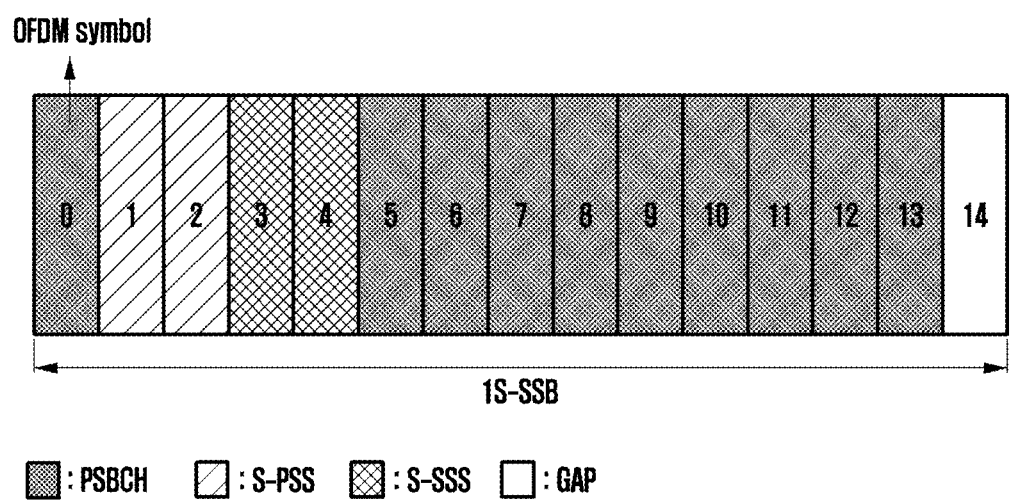
FIG. 6 is a diagram illustrating the structure of a sidelink synchronization channel according to an embodiment of the disclosure.

FIG. 6 is a diagram illustrating the structure of a sidelink synchronization channel according to an embodiment of the disclosure.

A sidelink synchronization channel may be interchangeably used with a sidelink synchronization single block (S-SSB), and a single S-SSB may include 14 symbols as illustrated in FIG. 6. A single S-SSB may include a sidelink primary synchronization signal (S-PSS), a sidelink secondary synchronization signal (S-SSS), a physical sidelink broadcast channel (PSBCH), and a guard period (GAP). In this instance, each of the S-PSS and the S-SSS may include two OFDM symbols, the PSBCH may include 10 OFDM symbols, and the GAP may include a single OFDM symbol.

In this instance, as illustrated in FIG. 6, the S-PSS is mapped to an OFDM symbol index #1 and #2, the S-SSS may be mapped to OFDM symbol index #3, and #4, and the GAP may be mapped to the last OFDM symbol of the S-SSB (i.e., OFDM symbol index #13). The PSBCH may be mapped to the remaining OFDM symbols, excluding the symbols for the S-PSS, S-SSS, and GAP. Although FIG. 6 illustrates that the S-PSS and the S-SSS are located in consecutive symbols, the S-PSS and the S-SSS may be spaced a single symbol apart from each other. That is, the S-PSS may be mapped to OFDM symbol index #1 and #2, the S-SSS may be mapped to OFDM symbol index #3 and #4, and the PSBCH may be mapped to OFDM symbol index #0, #5, #6, #7, #8, #9, #10, #11, #12, and #13. Although not illustrated in FIG. 6, a demodulation reference signal (DMRS) may be transmitted via each of the OFDM symbols to which the PSBCH is mapped.

Figure 7:
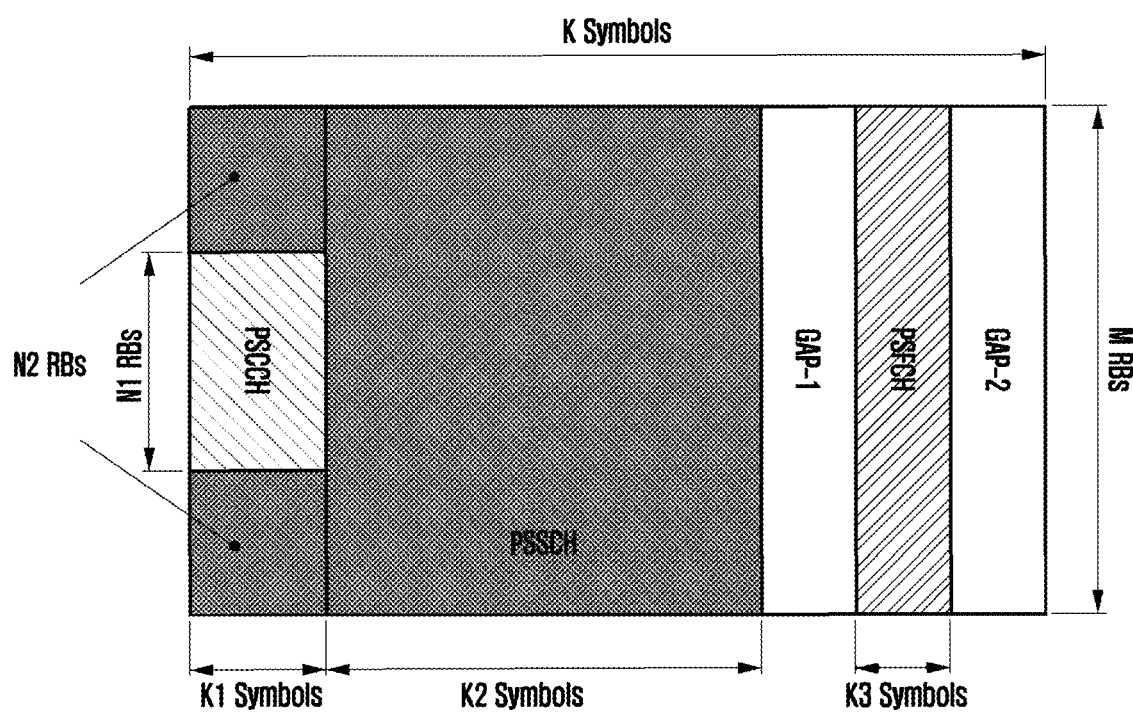
FIG. 7 is a diagram illustrating the structure of a sidelink control channel and a data channel according to an embodiment of the disclosure.

FIG. 7 is a diagram illustrating the structure of a sidelink control channel and a data channel according to an embodiment of the disclosure.

In FIG. 7, a sidelink control channel (physical sidelink control channel (PSCCH)) may include K1 symbols and N1 frequency blocks (RBs). In addition, a sidelink data channel (physical sidelink data channel (PSSCH)) may include N2 RBs in K1 symbols, and M RBs in the remaining K2 symbols. In FIG. 7, it is illustrated that a PSFCH includes K3 symbols and M RBs, and the number of RBs included in the PSSCH and the number of RBs included in the PSFCH are identical. However, the magnitude of the resource of the PSFCH in the frequency axis may be smaller than the number of RBs included in the PSSCH. For example, the PSSCH may include 10 RBs, and the PSFCH may include one RB.

In FIG. 7, K1 and K2 may be identical to, or different from, each other. In addition, if K1 and K2 are different from each other, K1>K2 or K1<K2. According to an embodiment, K1+K2+guard symbol 1+K3+guard symbol 2≤K, and guard symbol 1 and guard symbol 2 may be one symbol or two or more OFDM symbols. In this instance, guard symbol 1 and guard symbol 2 may different lengths of OFDM symbols. For example, guard symbol 1 may include two OFDM symbols, and guard symbol 2 may include one OFDM symbol.

According to an embodiment, a sidelink TX UE may transmit sidelink control information (SCI) via a PSCCH including K1 symbols in the time axis and N2 frequency blocks in the frequency axis, as shown in FIG. 7. The sidelink control information may include time/frequency allocation information of the PSSCH including K1+K2 symbols in the time axis and M frequency blocks in the frequency axis, and may be transmitted. A sidelink RX UE may receive and decode the PSCCH transmitted from the TX UE, may obtain the time/frequency allocation information of the PSSCH, and may decode the PSSCH. Although FIG. 7 illustrates that K2 symbols of the PSSCH are physically contiguously located after K1 symbols included in the PSCCH, they may not be physically contiguous (i.e., they may be logically contiguous but physically incontiguous). According to an embodiment, in FIG. 7, guard symbol 1 (GAP-1) may be used when the sidelink TX UE transmits a PSCCH and a PSSCH to one or more sidelink RX UEs, and receives PSFCHs from one or more sidelink RX UEs. That is, guard symbol 1 (GAP-1) may be an interval needed for switching between PSCCH/PSSCH transmission and PSFCH reception from the perspective of the sidelink TX UE, and may be an interval needed for switching between PSCCH/PSSCH reception and PSFCH transmission from the perspective of the sidelink RX UE.

Unlike the structure of a sidelink slot illustrated in FIG. 7, a slot in which a PSFCH is not present may be considered. In this instance, the sidelink slot may include K1 frequency-division multiplexed PSCCH/PSSCH symbols, K2 PSSCH symbols, and a guard symbol (GAP-2) located in the last of the slot. That is, the sidelink TX UE may use a symbol (i.e., K−(K1+1) symbols, in this instance, the number of symbols of GAP-2 is assumed to be 1) remaining after excluding the K1 frequency division multiplexed PSCCH/PSSCH symbols from K symbols included in the sidelink slot, in order to transmit a PSSCH.

Although FIG. 7 illustrates that the PSCCH is located in the middle of the sidelink slot in the frequency axis, the disclosure is not limited thereto. For example, the PSCCH may have N1 RBs from the lowest RB index or the highest RB index.

Figure 8:
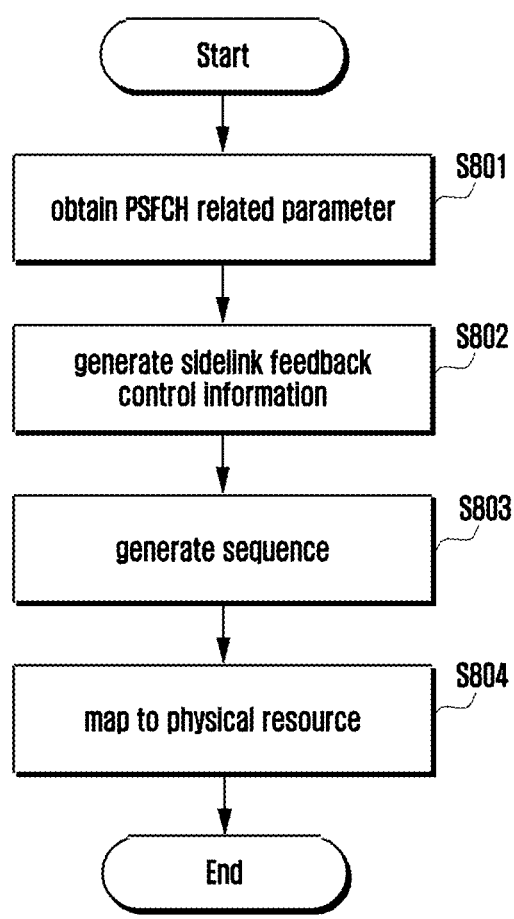
FIG. 8 is a diagram illustrating an example of a process for transmitting a sidelink feedback channel by a V2X UE in a wireless communication system according to various embodiments of the disclosure.

FIG. 8 is a diagram illustrating an example of a process for transmitting a sidelink feedback channel by a V2X UE in a wireless communication system according to various embodiments of the disclosure. Particularly, FIG. 8 is a diagram illustrating another example of a signal processing method for transmitting a sidelink feedback channel by a V2X UE according to an embodiment of the disclosure.

Referring to FIG. 8, in operation S801, an NR V2X reception (RX) UE may have parameters for transmitting a sidelink feedback channel, the parameters including at least one of the following information.

1. Information associated with the code resource of a PSFCH: In this instance, the code resource may include a resource identified using a code such as a scrambling code, an orthogonal cover code, or the like which may be used for a PSFCH, and a resource identified using different sequences (and a cyclic shift applied to a sequence). For example, if a HARQ ACK/NACK is transmitted via a PSFCH, the information may be a CS value to be used for an ACK and a CS value to be used for a NACK.

2. Information associated with a PSFCH format: For example, if it is assumed that two PSFCH formats are supported, PSFCH format 1 may be used for transmitting SFCI information of 2 or fewer bits, and PSFCH format 2 may be used for transmitting SFCI information of 3 or more bits. Therefore, the information associated with a PSFCH format may be PSFCH format 1 or PSFCH format 2 in the example.

In operation S802, the NR V2X RX UE may generate SFCI information to be transmitted via a PSFCH, according to a configuration or indication from a base station or an NR V2X transmission (TX) UE.

1. For example, whether to transmit only NACK information or to respectively transmit ACK information and NACK information may be configured or indicated.

In operation S803, a sequence may be generated using the SFCI information generated in operation S802 and one of the methods described in operation S801.

1. In this instance, a single sequence may be mapped to a single piece of SFCI information. For example, 1-bit ACK information may be sequence 1, and 1-bit NACK information may be sequence 2. In addition, 2-bit ACK information may be sequence 3, and 2-bit NACK information may be sequence 4. In the example, different sequences mean that different CS values are used. More particularly, in the example, if 1-bit ACK/NACK information is transmitted, ACK information may use CS=0 and NACK information may use CS=6. Similarly, if 2-bit ACK/NACK information is transmitted, (ACK, ACK) information may use CS=0, (ACK, NACK) information may use CS=3, (NACK, ACK) information may use CS=6, and (NACK, NACK) information may use CS=9.

2. In the example, the length of a sequence may be proportional to the magnitude of a frequency resource configured or indicated by the base station or the V2X TX UE for transmission of a PSFCH. For example, if the size of a PSFCH frequency resource is configured or indicated as "1", the length of a sequence that the V2X RX UE needs to generate is 12×1=12. If the size of a PSFCH frequency resource is configured or indicated as "2", the length of a sequence that the V2X RX UE needs to generate is 24×2=12.

3. As another example of the configuration of a sequence length, the base station or the V2X TX UE may configure or indicate a set of the sizes of frequency resources that the V2X RX UE is capable of using, and the V2X RX UE may select and use one from the corresponding set. In this instance, a criterion for selection may be determined based on the quality of reception of a PSCCH and/or PSSCH that the V2X RX UE receives from the V2X TX UE. For example, if the quality of reception is good, a sequence having a short length may be selected. That is, a small sized frequency resource may be used. If the quality of reception is poor, a sequence having a long length may be selected. The base station or the V2X TX UE may configure or indicate a threshold value for providing a criterion to be used for the V2X RX UE to determine whether the quality of reception is good or poor. Particularly, if the quality value of a channel that the V2X RX UE receives is lower than, or lower than or equal to, a threshold value configured or indicated by the base station or the V2X TX UE, it is determined that the quality of the channel is poor. Otherwise, it is determined that the quality of the channel is good.

In operation S804, the generated sequence may be mapped to a frequency resource (resource element (RE)) which is a physical resource of a PSFCH. Although not illustrated in FIG. 8, an OFDM symbol may be generated via inverse fast Fourier transform (IFFT) after operation S804, a cyclic prefix (CP) may be added thereto, and the OFDM symbol may be transmitted to an antenna.

Although unicast communication including a single NR V2X RX UE has been described mainly in the example, the disclosure may be extended to groupcast communication including two or more NR V2X RX UEs.

Figure 9:
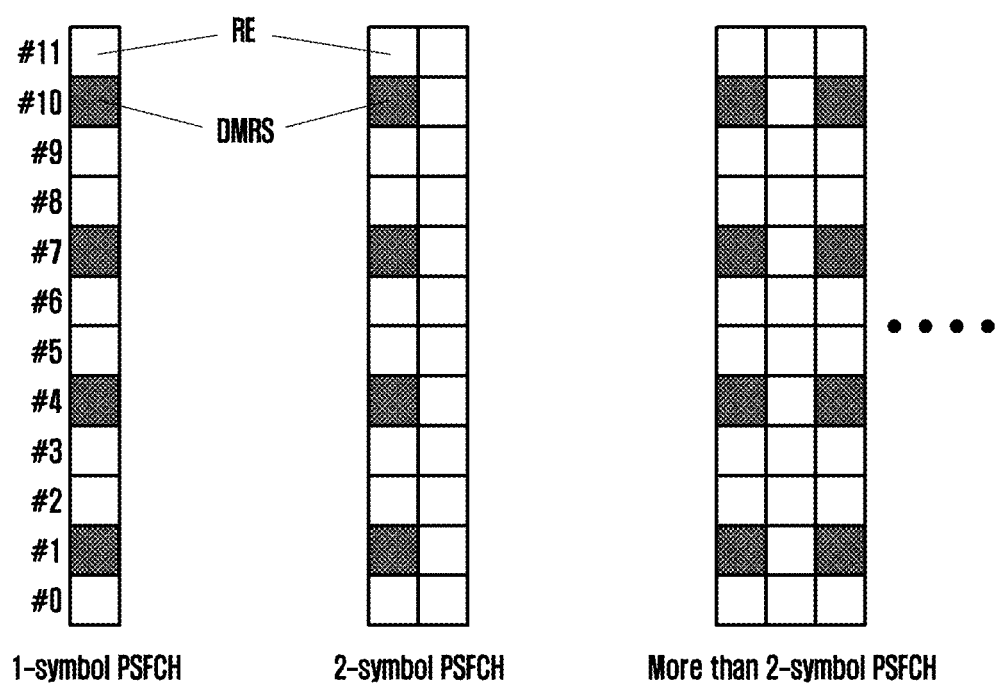
FIG. 9 is a diagram illustrating the structure of a sidelink feedback channel according to an embodiment of the disclosure.

FIG. 9 is a diagram illustrating the structure of a sidelink feedback channel according to an embodiment of the disclosure.

FIG. 9 illustrates the structure of a single sidelink feedback channel (PSFCH) that a TX UE is capable of transmitting, and a PSFCH may be used for transmitting sidelink HARQ feedback information described in FIGS. 4 and 5. Although it is assumed that a DMRS overhead is ⅓ (i.e., 4 resource elements (REs) among 12 REs are used as a DMRS), the disclosure is not limited thereto. For example, if a DMRS overhead is ¼ (i.e., 3 REs among 12 REs are used as a DMRS), a DMRS may be mapped to RE index #1, #5, and #9 (or #2, #6, and #10) and sidelink HARQ feedback information may be mapped to the remaining RE indices.

Although the structure of a single PSFCH including a single RB (i.e., 12 REs) is illustrated in FIG. 9, in the same manner as FIG. 8, the disclosure may be equally applied to a single PSFCH including two or more RBs. That is, if it is assumed that two RBs corresponds to the size of a single PSFCH frequency resource that a sidelink RX UE transmits, the DMRS may be mapped to RE index #1, #4, #7, #10, #13, #16, #19, and #22, and the sidelink HARQ feedback information may be mapped to the remaining RE indices.

In FIG. 8, if a single PSFCH that a single sidelink RX UE transmits includes two or more OFDM symbols in the time axis, a PSFCH including one OFDM symbol is repeated. However, in the example of FIG. 9, a DMRS is present only in an odd number OFDM symbol but not in an even number OFDM symbol (i.e., a DMRS is present in a first and third OFDM symbols, but is not present in a second OFDM symbol).

The PSFCH of FIG. 9 may be mapped to K3 symbols in a sidelink slot resource of FIG. 7. Although not illustrated in FIG. 9, the sidelink HARQ feedback information may be mapped to all REs of the PSFCH without an RE used for transmitting a DMRS (i.e., without a DMRS).

In addition, FIG. 9 illustrates that a DMRS is present in the same REs in the frequency axis, although the number of OFDM symbols is increased, the disclosure is not limited thereto. That is, in the case of a PSFCH including 3 OFDM symbols, the location of a DMRS RE in the third OFDM symbol may be different from the location of a DMRS RE existing in the first OFDM symbol. In the same manner, in the case of a PSFCH including 4 or more OFDM symbols, the location of a DMRS RE in each OFDM symbol where a DMRS is present may be different from each other. As another example, in the case of a PSFCH including 4 or more OFDM symbols, the locations of DMRS REs in OFDM symbols where at least two or more DMRSs are present may be identical.

Figure 10:
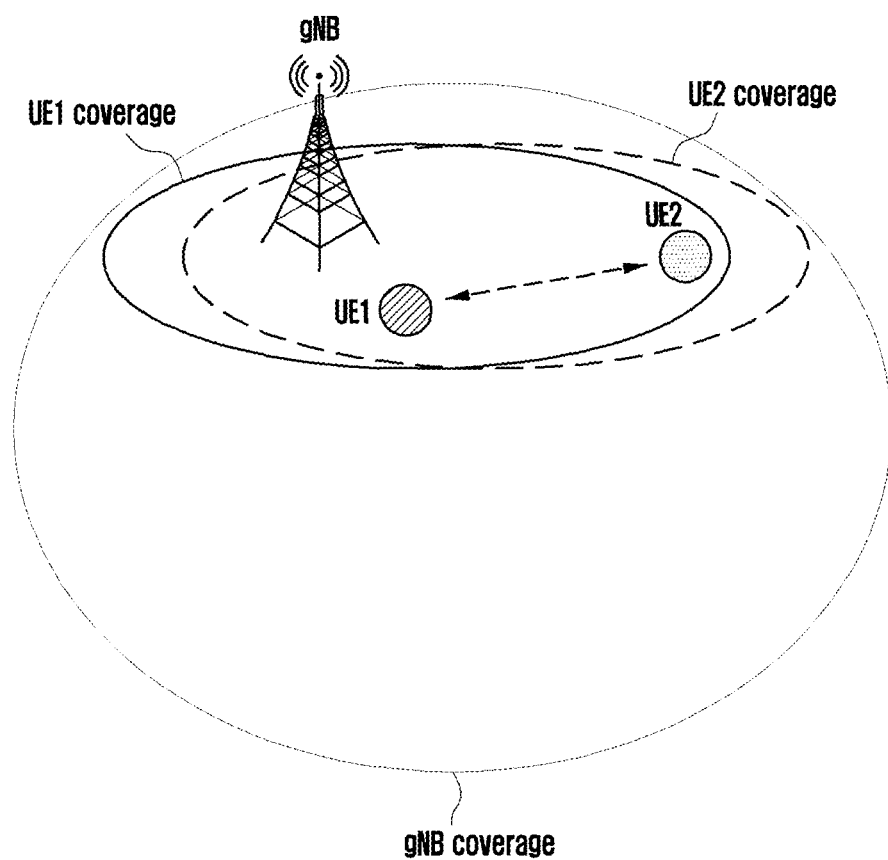
FIG. 10 is a diagram illustrating an example of controlling sidelink transmission power according to an embodiment of the disclosure.

FIG. 10 is a diagram illustrating an example of controlling sidelink transmission power according to an embodiment of the disclosure.

In FIG. 10, it is assumed that UE1 is located close to a base station (gNB), and UE2 is located far away from the gNB (i.e., UE1 is located in the center of a cell, and UE2 is located in an edge of the cell). It is assumed that UE1 and UE2 perform sidelink communication, UE1 is a sidelink TX UE, and UE2 is a sidelink RX UE. In this instance, UE1 may control sidelink transmission power for sidelink transmission. A parameter for sidelink transmission power of UE1 may include at least $P_0$, $\alpha$, a pathloss estimated value, and the size of a frequency block allocated, as shown in Equation 1.

$$\text{sideline TX power} = \min\{Pc\max, P_{Congestion}, P_0 + \alpha PL + 10 \log 10(M2^\mu) + \Delta\} \text{ [dBm]} \quad \text{[Equation 1]}$$

In Equation 1, each parameter is defined as follows.

Pcmax: denotes the maximum transmission output of a UE which is determined by the UE based on a P-max value configured by a base station via system information or RRC (if a base station is not present, a preconfigured value), the power class of the UE contained in the UE, or the like.

$P_{Congestion}$: denotes a parameter that reflects a congestion level of a sidelink TX UE, and indicates the maximum transmission power that the sidelink TX UE is capable of using based on a congestion level. Particularly, if the base station determines that a congestion level is high in a resource pool configured by the base station, the base station may transmit a $P_{Congestion}$ value to the sidelink TX UE via system information or RRC configuration. As another example, the sidelink TX UE may be configured with a $P_{Congestion}$ value when connecting a unicast link via PC-5 RRC. As another example, the sidelink TX UE may use a $P_{Congestion}$ value included in preconfigured resource pool information. The $P_{Congestion}$ value may be expressed in [dBm], and may be in the range of −41 [dBm] to 31 [dBm] at intervals of 1 [dBm]. The $P_{Congestion}$ value may have an associative relationship with priority of a sidelink channel that the sidelink TX UE transmits. That is, if the priority of the sidelink channel that the sidelink TX UE transmits is high, transmission of the sidelink channel needs to be successfully performed even though a congestion level is high. Accordingly, the $P_{Congestion}$ value which is configured via PC-5 RRC or is preconfigured may be high (e.g., 31 [dBm]). Conversely, if the priority of the sidelink channel that the sidelink TX UE transmits is low and a congestion level is high, it is no matter if transmission of the sidelink channel fails (or the transmission is abandoned). Accordingly, the $P_{Congestion}$ value which is configured via PC-5 RRC or is preconfigured may be low (e.g., −41 [dBm]). The above-mentioned sidelink channel may include a sidelink synchronization channel.

$P_O$: denotes a value configured by a base station via system information or RRC (a preconfigured value if a base station is not present) in order to secure the quality of a link of a reception UE.

α: denotes a parameter used for performing compensation associated with a pathloss value, has a value in the range of 0 to 1, and indicates a value configured by a base station via system information or RRC (a preconfigured value if a base station is not present). For example, if α=1, compensation of 100% may be performed with respect to a pathloss. If α=0.8, only compensation of 80% may be performed with respect to a pathloss.

M: denotes the size of a frequency block allocated for sidelink transmission. In this instance, $2^\mu$ may be a parameter for performing compensation associated with a power spectral density (PSD) which differs depending on a subcarrier spacing. For example, in the case of a subcarrier spacing of 15 kHz is used, μ=0. If the subcarrier spacing is increased to 30 kHz which is two times greater than before although the same number of frequency blocks are used, the PSD may be decreased to the half of the PSD of the case of the subcarrier spacing of 15 kHz. Therefore, for compensation, power needs to be increased by two folds. More particularly, if two frequency blocks are used, for example, 10 log 10(2×2⁰)=3 dB may be needed in the case of a subcarrier spacing of 15 kHz. However, in the case of a subcarrier spacing of 30 kHz, transmission power needs to be increased to 10 log 10(2×2¹)=6 dB in order to maintain the same PSD as that of the case of the subcarrier spacing of 15 kHz.

PL: denotes a pathloss estimated value. In this instance, a pathloss value may be estimated according to Equation 2.

PL=Transmission power for a signal used for estimating a pathloss–the reference signal received power (RSRP) measurement value of a signal used for estimating a pathloss [Equation 2]

Equation 2 may be applied differently depending on a scenario as described below.

If a signal used for estimating a pathloss is a sidelink signal: UE1 which is a sidelink TX UE may transmit a sidelink reference signal to UE2 which is a sidelink RX UE. UE2 may receive the sidelink reference signal, may measure an RSRP value, and may report the same to UE1. In this instance, the RSRP value may be transmitted via a PSFCH or a PSSCH. If the RSRP value is transmitted via the PSSCH, it may be transmitted in an MAC layer or an RRC layer. UE1 may estimate a sidelink pathloss value using Equation 2 based on the transmission power for the reference signal transmitted to UE2 and the RSRP value reported from the UE2. As another example, UE1 may transfer, to UE2, information associated with the transmission power for the reference signal that the UE1 transmits. UE2 that receives the information may measure an RSRP value from the reference signal that UE1 transmits, and may estimate a pathloss value based on Equation 2. UE2 may transmit the estimated sidelink pathloss value to UE1 via a PSFCH or a PSSCH. If the sidelink pathloss estimated value is transmitted via the PSSCH, a MAC CE may be used. If the distance between UE1 and UE2 is farther than the distance between UE1 and the gNB, a sidelink signal transmitted by UE1 may cause interference to a reception signal for the gNB. Detailed description thereof will be described with reference to FIGS. 11 and 12.

Figure 11:
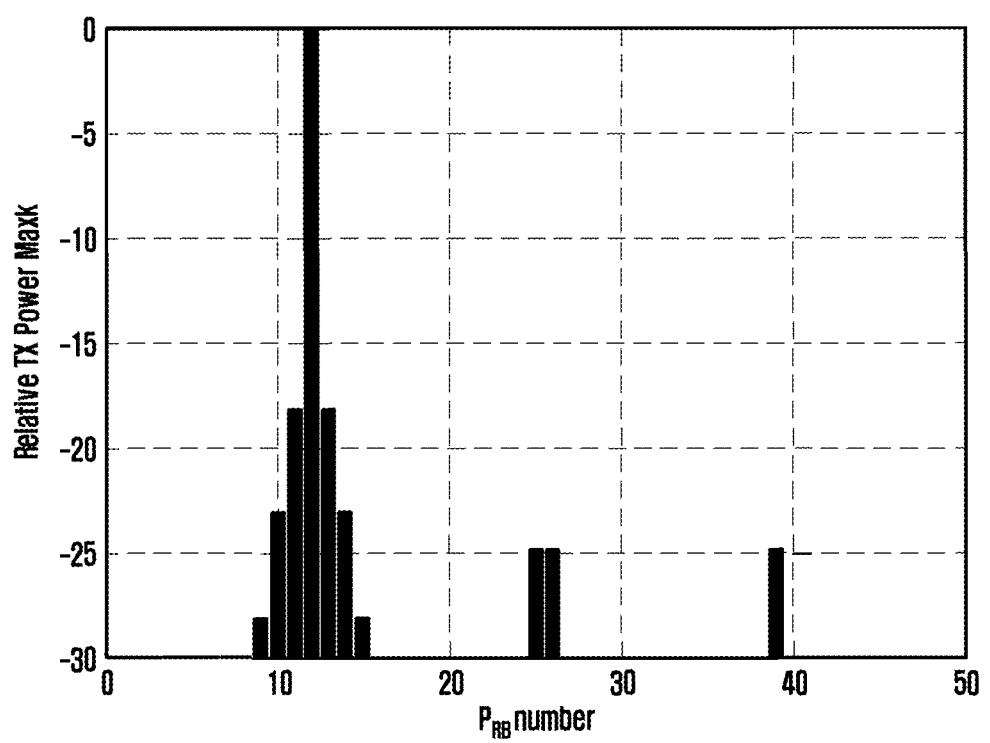
FIG. 11 is a diagram illustrating interference that a frequency block transmitted by a sidelink UE causes to an adjacent frequency block according to an embodiment of the disclosure.
Figure 12:
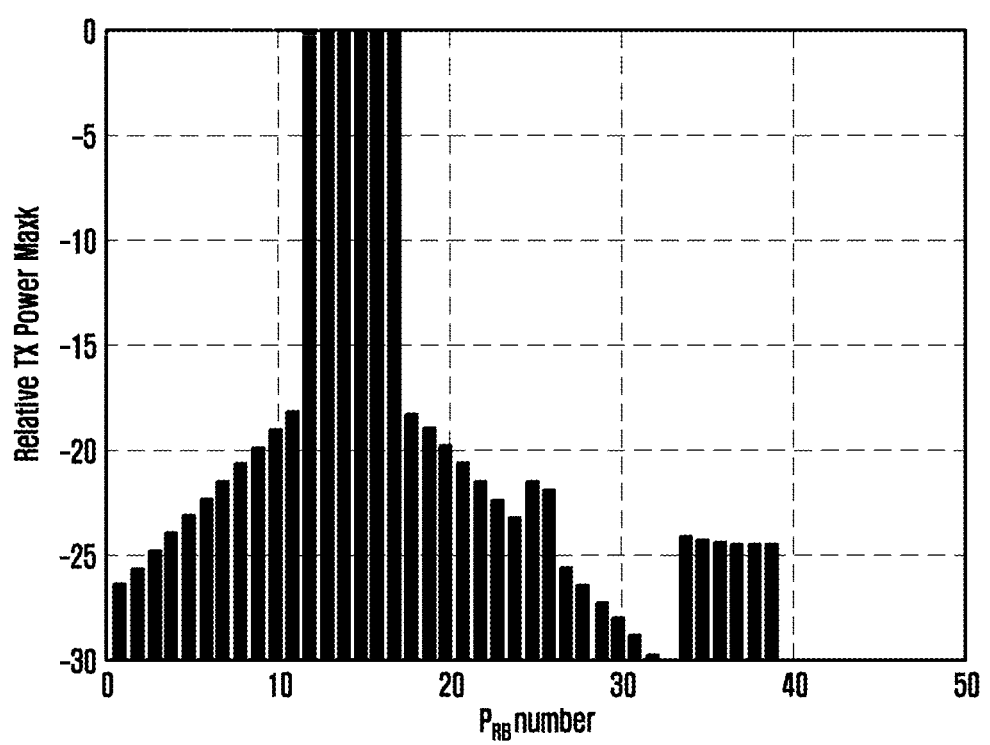
FIG. 12 is a diagram illustrating interference that a frequency block transmitted by a sidelink UE causes to an adjacent frequency block according to an embodiment of the disclosure.

FIGS. 11 and 12 are diagrams illustrating interference that a frequency block transmitted by a sidelink UE causes to an adjacent frequency block according to an embodiment of the disclosure.

Referring to FIG. 11, if the distance between UE1 and UE2 is farther than the distance between UE1 and a gNB, a sidelink signal transmitted by UE1 may cause interference to a reception signal for the gNB. For example, FIGS. 11 and 12 illustrate examples of the degree of interference that a sidelink signal causes to a reception signal for the gNB. In FIG. 11, it is assumed that sidelink control information or data information are transmitted in resource block index #12 (one resource block is used). In addition, In FIG. 12, it is assumed that sidelink control information or data information are transmitted using 5 resource blocks corresponding to resource block index #12 to #17. In FIG. 11, sidelink transmission is performed only at a resource block index #12, and thus, transmission power is supposed to be produced at the corresponding resource index. However, transmission power may be produced at neighboring resource indices (e.g., index #9, #10, #11, #13, #14, and #15) due to interference (in-band emission). The amount of interference may become worse when the number of resource blocks allocated to sidelink transmission is increased, as shown in FIG. 12. Therefore, a sidelink TX UE located close to the gNB may need to use a low transmission power so as not to cause interference to an uplink reception signal for the gNB.

If a signal used for estimating a pathloss is a downlink signal of the gNB: In order to reduce interference to a reception signal for the gNB, UE1 which is a sidelink TX UE may apply a downlink pathloss value associated with the gNB to Equation 1. Particularly, the downlink pathloss value may be estimated by UE1 based on a CSI-reference signal (RS) transmitted by the gNB. As another example, UE1 may estimate a downlink pathloss value using a secondary synchronization signal (SSS) transmitted by the gNB, or may estimate a downlink pathloss value using both an SSS and a demodulation reference signal (DMRS) transmitted via a physical broadcast channel (PBCH). In this instance, UE1 may estimate a downlink pathloss basically using an SSS, and may determine whether to additionally use a DMRS transmitted via a PBCH depending on implementation by the UE1. As another example, UE1 may estimate a downlink pathloss value using a reference signal (channel state information reference signal (CSI-RS)) for obtaining channel information transmitted by the gNB. Which of the signals (SSS and CSI-RS) is to be used when UE1 estimates a downlink pathloss value may differ depending on the state of the connection between UE1 and the gNB. For example, if UE1 is in the state (RRC connected state) of being RRC connected with the gNB, UE1 may be configured with information indicating which of the signals needs to be used for estimating a downlink pathloss value, by the gNB. If UE1 is in the state (RRC idle state) of being RRC disconnected from the gNB, UE1 may estimate a downlink pathloss value using an SSS or both an SSS and a demodulation reference signal (DMRS) transmitted via a PBCH. In this instance, as described above, UE1 may estimate a downlink pathloss basically using an SSS, and may determine whether to additionally use a DMRS transmitted via a PBCH depending on implementation by the UE1. The gNB may transmit information associated with transmission power for a reference signal to UE1 via system information or RRC configuration, and UE1 may measure an RSRP value using the reference signal transmitted from the gNB. UE1 may estimate a downlink pathloss value using Equation 2 based on the transmission power value for the reference signal transferred from the gNB and the measured RSRP value. By using the downlink pathloss value, interference to the reception signal for the gNB illustrated in FIGS. 11 and 12 may be overcome.

The gNB may perform configuration in association with a reference signal to be used by a UE for estimating a pathloss (PL) in Equation 1 (i.e., whether an SSS or CSI-RS needs to be used for estimating a downlink pathloss, or a sidelink reference signal needs to be used for estimating a sidelink pathloss).

Δ: denotes a TPC command for controlling closed-loop power, or may be another RRC parameter. For example, this may be an offset value of transmission power based on the format of a sidelink feedback channel. As another example, this may be a compensation value for transmission power based on the frequency spectral efficiency of a sidelink feedback channel. That is, when frequency spectral efficiency is high (i.e., the case in which a smaller amount of resource is used in order to transmit the same bits or the case in which a larger number of bits are transmitted in the same resource), a high transmission power needs to be used. Accordingly, this may be a parameter that performs compensation associated with a transmission power value based on a frequency spectral efficiency. Although it is illustrated that Δ includes a single parameter in Equation 1, Δ may include a combination of two or more parameters.

Figure 13:
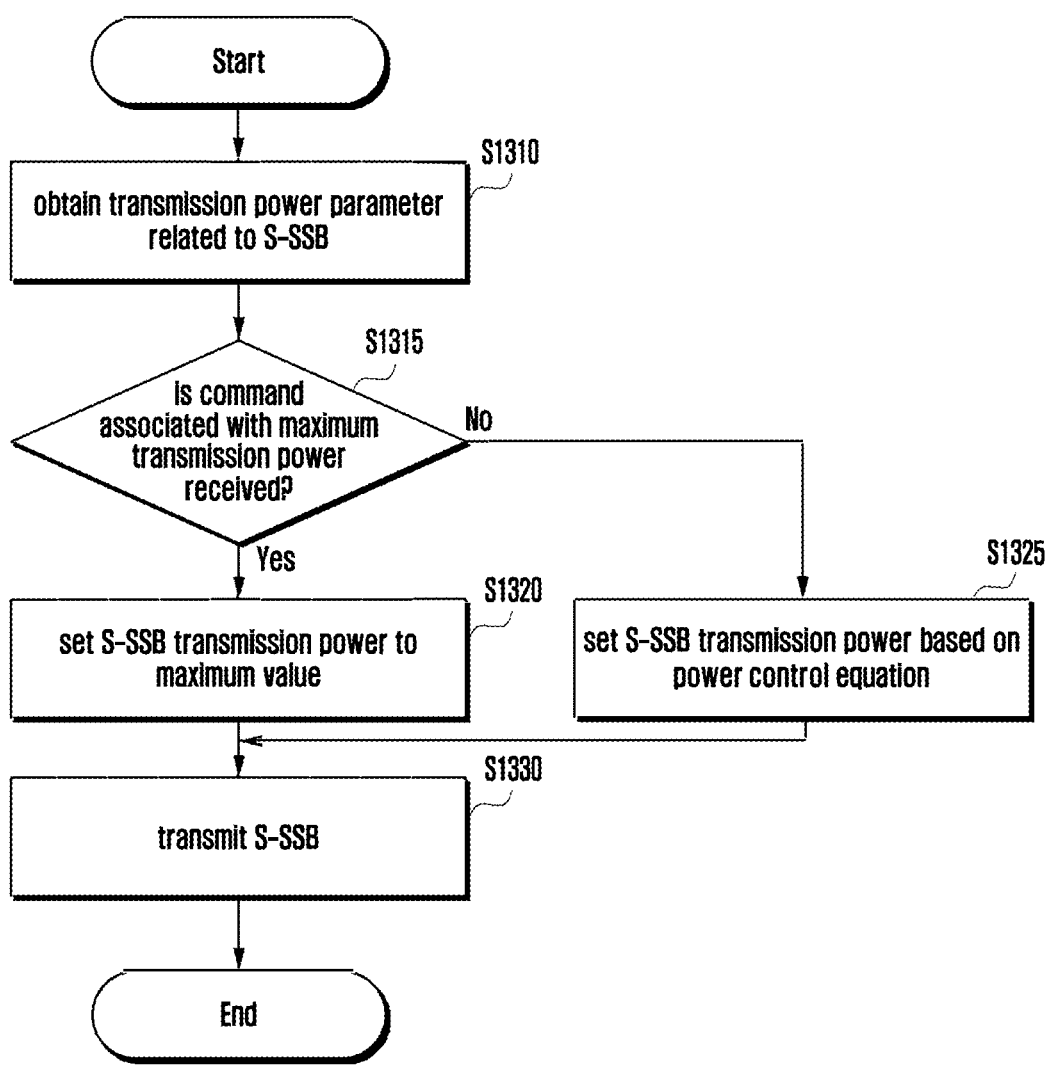
FIG. 13 is a diagram illustrating a method of controlling transmission power for a sidelink synchronization channel according to an embodiment of the disclosure.

FIG. 13 is a diagram illustrating a method of controlling transmission power for a sidelink synchronization channel according to an embodiment of the disclosure.

According to an embodiment, whether a sidelink synchronization channel is transmitted may differ based on the capability of a sidelink UE. That is, a sidelink UE that has the capability of transmitting a sidelink synchronization channel may transmit a sidelink synchronization channel in response to a command from a base station. In this instance, the sidelink UE may be in the state (RRC connection state) of being RRC connected with the base station, and the base station may command, via RRC or downlink control information (DCI), the sidelink UE to transmit a sidelink synchronization channel.

As another example, the sidelink UE that has the capability of transmitting a sidelink synchronization channel may determine whether the UE itself transmits the sidelink synchronization channel. In this instance, the sidelink UE may be in the coverage area of the base station but may be in the RRC idle state. In this instance, the base station may configure a threshold value of a downlink reference signal received power (RSRP) via sidelink-dedicated system information (system information block (SIB)). The sidelink UE that receives the system information from the base station may compare a downlink RSRP value (R measure), measured itself and received in a downlink with the base station, and the downlink RSRP threshold value (R threshold), and may transmit a sidelink synchronization channel. More particularly, if R_measure<R_threshold or R_measure≤R_threshold, the sidelink UE may transmit a sidelink synchronization channel.

In addition to the command associated with the transmission of a sidelink synchronization channel, the base station may transmit a transmission power parameter for transmission of a sidelink synchronization channel to the sidelink UE via system information and/or RRC configuration in operation S1310, as illustrated in FIG. 13. In this instance, the transmission power parameter for the transmission of a sidelink synchronization channel may be at least one of $P_O$, α, μ, M, and Δ values in Equation 1.

In addition, the transmission power parameter for transmission of a sidelink synchronization channel may include information associated with whether a downlink pathloss needs to be estimated to configure a transmission power value, a sidelink pathloss needs to be estimated to configure a transmission power value, or both the downlink pathloss and the sidelink pathloss need to be estimated to configure a transmission power value. The information may be transmitted from the base station to the UE via system information or RRC, and the information may be at least one of the following information.

1) Transmit Link Information that the UE Needs to Use for Estimating a Pathloss, Via Indication or Configuration of the Type of Reference Signal That is, the base station may transmit information associated with a link that the UE may use to estimate a pathloss (PL), by indicating a reference signal to be used among a downlink SSB, a downlink CSI-RS, or a DMRS of a sidelink data channel. For example, based on an agreement between the base station and the UE, if an indicator index is 0, it indicates a downlink SSB. If an indicator index is 1, it indicates a downlink CSI-RS. If an indicator index is 2, it indicates a DMRS of a sidelink data channel. If an indicator index is 3, it indicates that both a downlink SSB and a DMRS of a sidelink data channel may be used. If an indicator index is 4, it indicates that both a downlink CSI-RS and a DMRS of a sidelink data channel may be used. As another example, the type of reference signal that the UE needs to use for estimation of a pathloss may be explicitly included in the system information or RRC configuration information.

2) Transmit Link Information that the UE Needs to Use for Estimating a Pathloss, Via a Transmission Power Parameter Such as $P_O$, α, or the Like That is, the base station may differently configure a transmission power parameter to be used for applying a downlink pathloss and a transmission power parameter to be used for applying a sidelink pathloss. The UE that receives the information may determine whether a downlink pathloss or a sidelink pathloss needs to be applied. More particularly, the base station may configure $P_O$ and α parameters in Equation 1 using different parameters by distinguishing the case in which the UE needs to apply a downlink pathloss and the case in which the UE needs to apply a sidelink pathloss. For example, the base station may configure $P_{O\_DL}$ and $α_{DL}$ if the downlink pathloss needs to be applied, and the base station may configure $P_{O\_SL}$ and $α_{SL}$ if the sidelink pathloss needs to be applied. If both the downlink pathloss and the sidelink pathloss need to be applied, the base station may configure $P_{O\_DL}$, $α_{DL}$, $P_{O\_SL}$, and $α_{SL}$.

Using at least one of the above-described methods, the UE that is to transmit a sidelink synchronization channel may determine whether a downlink path loss associated with the base station needs to be taken into consideration, a sidelink pathloss associated with another sidelink UE needs to be taken into consideration, or both the downlink pathloss and the sidelink pathloss need to be taken into consideration, when configuring a transmission power.

In addition to the above-mentioned parameters, a transmission power parameter for transmission of a sidelink synchronization channel may include a parameter for estimating a pathloss (PL) in Equation 1, which may denote the transmission power for a reference signal used for estimating a pathloss in Equation 2.

More particularly, the base station may perform configuration in association with the use of a downlink SSB or a downlink SCI-RS, via system information or RRC. The UE which receives the information and which is to transmit a sidelink synchronization channel may use a downlink SSB or a downlink CSI-RS transmitted by the base station for estimating a pathloss (PL) value in Equation 1 and Equation 2. In this instance, if the base station performs configuration in association with the use of a downlink SSB, the base station may transmit information associated with SSB transmission power to the UE via system information or RRC signaling. In the same manner, if the base station performs configuration in association with the use of a downlink CSI-RS, the base station may transmit information associated with CSI-RS transmission power to the UE via at least one signaling among system information, RRC, and DCI. In this instance, the method of signaling the information associated with CSI-RS transmission power may be performed by two steps. For example, the base station may transmit information associated with SSB transmission power to the UE via system information or RRC signaling, and may transmit an offset (difference) value between the SSB transmission power and the CSI-RS transmission power to the UE via at least one signaling among system information, RRC, and DCI.

At least one parameter among the transmission power parameters may be included in sidelink resource pool configuration information. For example, $P_{0,1}$, $\alpha_1$, $\mu_1$, $M_1$, and $\Delta_1$ may be configured for sidelink resource pool 1, and $P_{0,2}$, $\alpha_2$, $\mu_2$, $M_2$, and $\Delta_2$ may be configured for sidelink resource pool 2. In this instance, each transmission power parameter configured for a sidelink resource pool may be identical or different for each sidelink resource pool. That is, $P_{0,1}$ configured for sidelink resource pool 1 and $P_{0,2}$ configured for sidelink resource pool 2 may have an identical value or different values. In the same manner, $\alpha_1$ configured for sidelink resource pool 1 and $\alpha_2$ configured for sidelink resource pool 2 may have an identical value or different values.

As illustrated in FIG. 13, the UE that receives the transmission power parameter may receive a command indicating whether the maximum transmission power is used to transmit a sidelink synchronization channel from the base station in operation S1315. The UE that receives the command may transmit the sidelink synchronization channel at the maximum transmission power, which is as shown in Equation 3, in operation 1320.

$$P_{S\text{-}PSS}=P_{CMAX,PSBCH}$$

$$P_{S\text{-}SSS}=P_{CMAX,S\text{-}SSS} \quad \text{[Equation 3]}$$

In Equation 3, $P_{S\text{-}PSS}$ denotes a transmission power for an S-PSS, and $P_{S\text{-}SSS}$ denotes a transmission power for an S-SSS. If the base station commands transmission of a sidelink synchronization channel at the maximum transmission power, the UE may set the transmission power for an S-PSS to be equal to the maximum transmission power for a PSBCH, and may perform transmission. In addition, the UE may set the transmission power for an S-SSS to be equal to the maximum transmission power for an S-SSS and may perform transmission. In this instance, the S-PSS and the PSBCH may apply the same power back-off or the same maximum power reduction (MPR), and thus, the maximum transmission power for the S-PSS and the maximum transmission power for the PSBCH may be identical. However, when compared to the S-PSS/PSBCH, the S-SSS needs to apply a larger power back-off or higher MPR, the S-SSS may separately have the maximum transmission power value unlike the S-PSS/PSBCH. The reason that the power back-off of the S-SSS and the power back-off the S-PSS/PSBCH are different is that the peak-to-average power ratio (PAPR) of a sequence (gold sequence) more deteriorate than that of a Zadoff-chu sequence used for the S-PSS. That is, if the PAPR characteristic of the sequence used for the S-PSS and the PAPR characteristic of the sequence used for the S-SSS are similar, the S-PSS, the S-SSS, and the PSBCH may apply the same power back-off or the same MPR. In this instance, Equation 3 may be replaced with Equation 4 below.

$$P_{S\text{-}PSS}=P_{S\text{-}SSS}=P_{CMAX,PSBCH}=P_{CMAX} \quad \text{[Equation 4]}$$

$P_{CMAX}$ in Equation 4 may have the same meaning as that of $P_{CMAX}$ in Equation 1.

If the base station does not perform indication or configuration associated with transmission of a sidelink synchronization channel at the maximum transmission power in FIG. 13, the UE may determine the transmission power for the S-PSS, the S-SSS, and the PSBCH using Equation 5 and Equation 6 in operation S1325.

$$P_{S\text{-}PSS}+P_{PSBCH}=\min\{P_{CMAX,PSBCH}, 10\log_{10}(2^\mu \times M)+P_0+\alpha \times PL\} \text{ [dBm]}$$

$$P_{S\text{-}SSS}=\min\{P_{CMAX,S\text{-}SSS}, 10\log_{10}(2^\mu \times M)+P_0+\alpha \times PL\} \text{ [dBm]} \quad \text{[Equation 5]}$$

If a downlink pathloss value is applied to Equation 5, Equation 5 may be identical to the following equation.

$$P_{S\text{-}PSS}+P_{PSBCH}=\min\{P_{CMAX,PSBCH}, 10\log_{10}(2^\mu \times M)+P_{0DL}+\alpha_{DL} \times PL_{DL}\} \text{ [dBm]}$$

$$P_{S\text{-}SSS}=\min\{P_{CMAX,S\text{-}SSS}, 10\log_{10}(2^\mu \times M)+P_{0DL}+\alpha_{DL} \times PL_{DL}\} \text{ [dBm]}$$

If a sidelink pathloss value is applied to Equation 5, Equation 5 may be identical to the following equation.

$$P_{S\text{-}PSS}+P_{PSBCH}=\min\{P_{CMAX,PSBCH}, 10\log_{10}(2^\mu \times M)+P_{0SL}+\alpha_{SL} \times PL_{SL}\} \text{ [dBm]}$$

$$P_{S\text{-}SSS}=\min\{P_{CMAX,S\text{-}SSS}, 10\log_{10}(2^\mu \times M)+P_{0SL}+\alpha_{SL} \times PL_{SL}\} \text{ [dBm]}$$

If both a downlink pathloss and a sidelink pathloss value are applied to Equation 5, Equation 5 may be identical to the following equation.

$$P_{S\text{-}PSS}=P_{PSBCH}=\min\{P_{CMAX,PSBCH}, \min(A,B)\} \text{ [dBm]}$$

$$P_{S\text{-}SSS}=\min\{P_{CMAX,S\text{-}SSS}, \min(A,B)\} \text{ [dBm]}$$

In Equations, $A=10\log_{10}(2^\mu \times M)+P_{0\_DL}+\alpha_{DL} \times PL_{DL}$ and $B=10\log_{10}(2^\mu \times M)+P_{0\_SL}+\alpha_{SL} \times PL_{SL}$.

$$P_{S\text{-}PSS}=P_{S\text{-}SSS}=P_{PSBCH}=\min\{P_{CMAX}, 10\log_{10}(2^\mu \times M)+P_0+\alpha \times PL\} \text{[dBm]} \quad \text{[Equation 6]}$$

If a downlink pathloss value is applied to Equation 6, Equation 6 may be identical to the following equation.

$$P_{S\text{-}PSS}=P_{S\text{-}SSS}=P_{PSBCH}=\min\{P_{CMAX}, 10\log_{10}(2^\mu \times M)+P_{0\_DL}+\alpha_{DL} \times PL_{DL}\} \text{ [dBm]}$$

If a sidelink pathloss value is applied to Equation 6, Equation 6 may be identical to the following equation.

$$P_{S\text{-}PSS}=P_{S\text{-}SSS}=P_{PSBCH}=\min\{P_{CMAX}, 10\log_{10}(2^\mu \times M)+P_{0\_SL}+\alpha_{SL} \times PL_{SL}\} \text{[dBm]}$$

If both a downlink pathloss and a sidelink pathloss value are applied to Equation 6, Equation 6 may be identical to the following equation.

$$P_{S\text{-}PSS} = P_{S\text{-}SSS} = P_{PSBCH} = \min\{P_{CMAX}, \min(A,B)\} \text{ [dBm]}$$

In this instance, $A = 10 \log_{10}(2^{\mu} \times M) + P_{0\_DL} + \alpha_{DL} \times PL_{DL}$ and $B = 10 \log_{10}(2^{\mu} \times M) + P_{0\_SL} + \alpha_{SL} \times PL_{SL}$.

Equation 5 may be applied when the S-PSS/PSBCH and the S-SSS apply different back-off values or different MPRs. Equation 6 may be applied when the S-PSS/PSBCH and the S-SSS are applied the same power back-off or the same MPR. In this instance, $P_{CMAX}$ in Equation 6 may be replaced with $P_{CMAX,PSBCH}$ or $P_{CMAX,S\text{-}SSS}$ in Equation 5.

In Equation 3, Equation 4, Equation 5, Equation 6, and modifications of the mentioned equations, $P_{0\_DL}$, $\alpha_{DL}$, $P_{0\_SL}$, and $\alpha_{SL}$ may be identical to, or different from, $P_{0\_DL}$, $\alpha_{DL}$, $P_{0\_SL}$, and $\alpha_{SL}$ used for controlling transmission power for a sidelink control channel and a data channel. In Equation 3, Equation 4, Equation 5, Equation 6, and modifications of the mentioned equations, $P_{0\_DL}$, $\alpha_{DL}$, $P_{0\_SL}$, and $\alpha_{SL}$ may be identical to, or different from, $P_{0\_DL}$, $\alpha_{DL}$, $P_{0\_SL}$, and $\alpha_{SL}$ used for controlling transmission power for a sidelink feedback channel.

The UE that determines the transmission power for the S-PSS, the S-SSS, and the PSBCH based on the method of at least one of Equation 3, Equation 4, Equation 5, Equation 6, and modifications of the equations, may transmit the S-SSB at the corresponding transmission power in operation S1330.

Unlike FIG. 13, the operation of commending, by the base station, transmission of a sidelink synchronization channel at the maximum transmission power, may be omitted. In this instance, operation S1315 of determining, by the UE, whether to transmit a sidelink synchronization channel at the maximum transmission power, and operations S1320 and S1325 performed based on a result of the determination may be omitted.

Figure 14:
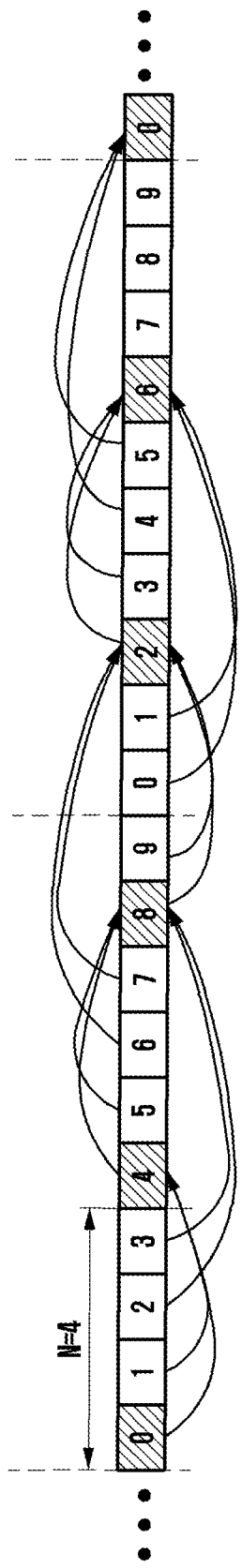
FIG. 14 is a diagram illustrating an example of allocating a time axis resource for a sidelink feedback channel according to an embodiment of the disclosure.

FIG. 14 is a diagram illustrating an example of allocating a time axis resource for a sidelink feedback channel according to an embodiment of the disclosure.

In FIG. 14, the time axis resource of a PSFCH (sidelink feedback channel) starts from slot #0, and has a periodic interval of 4 slots (N=4). Therefore, the time axis resource of the PSFCH (sidelink feedback channel) may be present in slot #0, slot #4, slot #8, slot #2, and slot #6. In addition, FIG. 14 assumes that K is 3 slots, which is the temporal relation between a PSSCH transmitted by a sidelink TX UE (i.e., a PSSCH received by a sidelink RX UE) and a PSFCH that the sidelink RX UE needs to transmit. That is, within a time shorter than 3 slots, the sidelink RX UE is incapable of decoding the PSSCH transmitted from the sidelink TX UE, preparing HARQ-ACK information and HARQ-NACK information, and transmitting the PSFCH. Therefore, as illustrated in FIG. 12, HARQ-ACK/NACK information associated with a PSSCH that the sidelink RX UE receives in slot #0 and #1 may be transmitted in slot #4. HARQ-ACK/NACK information associated with a PSSCH that the sidelink RX UE receives in slot #2, slot #3, slot #4, and slot #5 may be transmitted in slot #8. In addition, HARQ-ACK/NACK information associated with a PSSCH that the sidelink RX UE receives in slot #6, slot #7, slot #8, and slot #9 may be transmitted in slot #2. Although it is assumed that k is 3 in the embodiment, this is not limited thereto.

As illustrated in FIG. 14, a sidelink feedback channel (PSFCH) that transmits HARQ-ACK/NAC information associated with a sidelink data channel (PSSCH) may not be present in every slot, and may be present in some slots at predetermined intervals. That is, FIG. 14 illustrates an example in which a PSFCH has a periodic interval of 4 slots. A single sidelink RX UE may receive different PSSCHs from a plurality of sidelink TX UEs. In this instance, the sidelink RX UE may need to transmit a plurality of sidelink feedback channels. In addition, a single sidelink RX UE may receive different PSSCHs from the same sidelink TX UE. In this instance, the sidelink RX UE may need to transmit a plurality of sidelink feedback channels. To this end, a method of determining transmission power for a plurality of PSFCH transmission may need to be considered.

Figure 15:
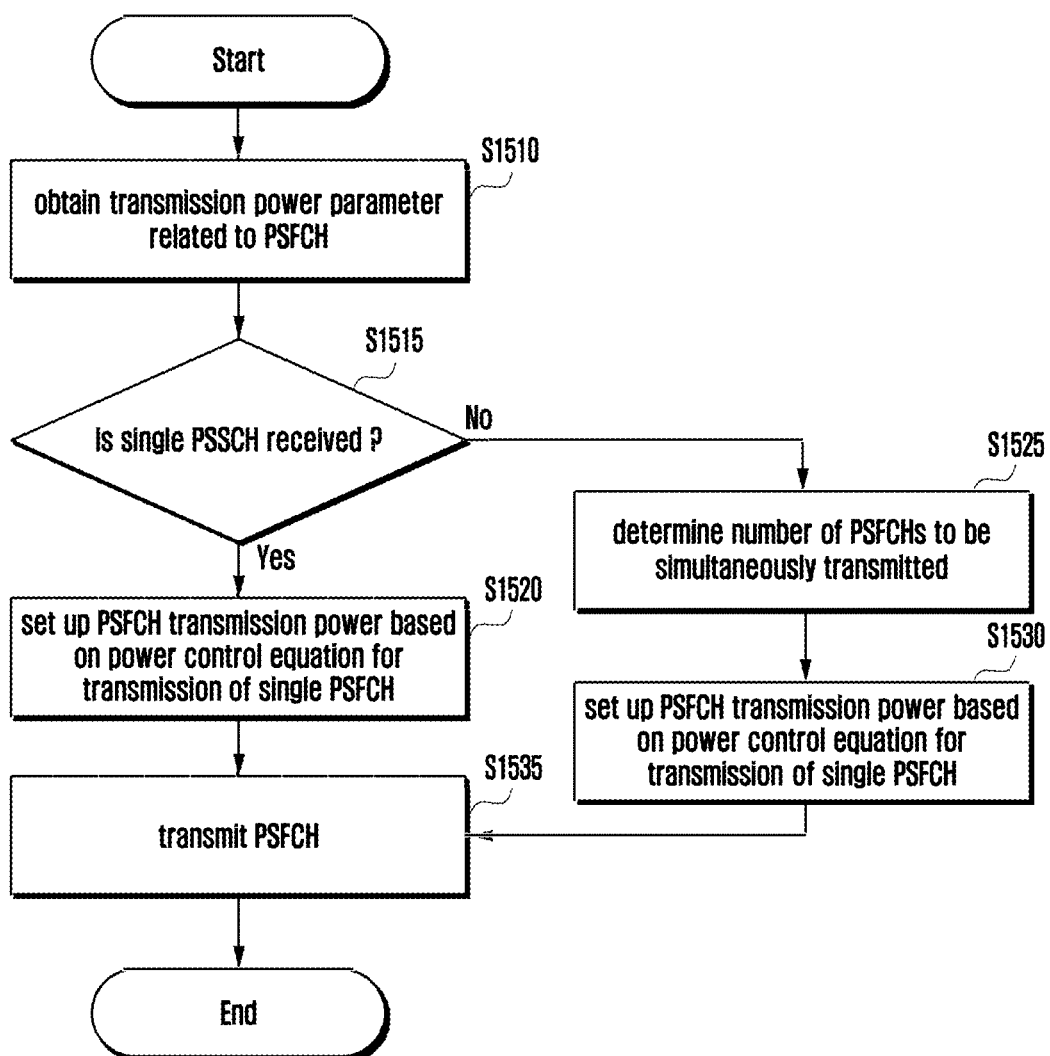
FIG. 15 is a flowchart illustrating an example of a transmission power determining method when a single sidelink reception UE transmits a plurality of sidelink feedback channels according to an embodiment of the disclosure.

FIG. 15 is a flowchart illustrating an example of a transmission power determining method when a single sidelink RX UE transmits a plurality of sidelink feedback channels according to an embodiment of the disclosure.

If a single sidelink RX UE transmits a single sidelink feedback channel, transmission power for a PSFCH may be determined based on Equation 7 below.

$$P_{PSFCH} = \min\{P_{CMAX}, 10 \log_{10}(2^{\mu} \times M) + P_{0\_PSFCH} + \alpha_{PSFCH} \times PL\} \text{ [dBm]} \quad \text{[Equation 7]}$$

In Equation 7, if the size of a frequency block used for transmitting a single PSFCH is 1, M may be omitted (i.e., M=1). In addition, in Equation 7, a pathloss value (PL) may be a downlink pathloss value. In this instance, as illustrated in FIGS. 10 to 13, the sidelink RX UE that is to transmit a PSFCH may estimate a downlink pathloss value based on an SSB, an SSB and a DMRS of a PBCH, or a CSI-RS transmitted by a base station. In this instance, $P_{0\_PSFCH}$ may be $P_{0\_DL\_PSFCH}$, and $\alpha_{PSFCH}$ may be $\alpha_{DL\_PSFCH}$.

If the sidelink RX UE that is to transmit a PSFCH is outside the coverage area of the base station, $\alpha_{PSFCH} = 0$ is preconfigured in Equation 7 (pre-configuration). If the sidelink RX UE is outside the coverage area of the base station, transmission power for the PSFCH may be determined by $\min\{P_{cmax}, 10 \log_{10}(2^{\mu} \times M) + P_{0\_PSFCH}\}$. As another example, if the sidelink RX UE is present outside the coverage area of the base station, transmission power for the PSFCH may be fixed to a predetermined value, as opposed to be determined based on an equation (e.g., Equation 7).

According to an embodiment, Equation 7 may be an equation associated with a method of determining PSFCH transmission power when a single sidelink RX UE transmits a single PSFCH. As illustrated in FIG. 14, a single sidelink RX UE may transmit a plurality of PSFCHs, and thus, a method of determining PSFCH transmission power for the case needs to be considered. It is assumed that the number of PSFCHs that a single UE is capable of transmitting simultaneously is N (although N denotes the periodic interval of a PSFCH time resource in FIG. 13, N denotes the number of PSFCHs that a single UE is capable of transmitting simultaneously in FIG. 15). In this instance, N may differ depending on the capability of a sidelink UE. For example, sidelink UE-1 may have N=4, sidelink UE-2 may have N=2, and sidelink UE-3 may have N=1. The capability of a sidelink UE may be reported to the base station if the sidelink UE is present in the coverage area of the base station (in-coverage). By taking into consideration of the capability of the UE, the base station may perform resource allocation for a sidelink feedback channel based on the capability (i.e., may configure the periodic interval of a PSFCH time resource based on the capability). A sidelink TX UE and a sidelink RX UE may exchange information associated with capability when they set up a PC-5 RRC connection.

N may be the maximum number of PSFCHs that the sidelink UE is capable of transmitting simultaneously, and the UE may use a smaller number than N when actually performing PSFCH transmission. For example, if N=4, the sidelink UE may transmit 2 PSFCHs simultaneously, wherein 2 is smaller than 4.

As illustrated in FIG. 15, the sidelink RX UE that is to transmit a PSFCH may receive a parameter associated with a PSFCH transmission power configuration from the base station via system information and/or RRC configuration in operation S1510. In this instance, the parameter associated with the PSFCH transmission power configuration may be at least one from among $P_0$, $\alpha$, $\mu$, M, $\Delta$ values and information associated with a link to which a pathloss value needs to be applied, as illustrated in FIGS. 10 to 13. The sidelink RX UE that receives the parameter may determine the number of PSSCHs needed for PSFCH transmission in operation S1515. In this instance, a PSFCH transmission resource may be determined based on a PSSCH frequency resource (e.g., a starting sub-channel index at which reception of a PSSCH starts) and a PSSCH time resource (e.g., a slot index at which a PSSCH is received). If a single PSSCH that requires PSFCH transmission is received, the sidelink RX UE may determine PSFCH transmission power based on Equation 7 in operation S1520. If a plurality of PSSCHs that require PSFCH transmission is received, and PSFCH transmission needs to be performed simultaneously, the sidelink UE may determine the number of PSFCHs to be simultaneously transmitted in operation S1525. In this instance, N indicating the maximum number of PSFCHs that the UE is capable of simultaneously transmitting may differ depending on the capability of the UE. The number of PSFCHs that the sidelink RX UE needs to transmit simultaneously may be configured for each resource pool. For example, if it is assumed that the number of PSFCHs that the sidelink RX UE needs to transmit simultaneously is L, L≤N needs to be satisfied. Particularly, if sidelink RX UEs having capabilities of N=4, N=3, and N=2 need to transmit PSFCHs, respectively, in a single resource pool, L configured for the corresponding resource pool may be L=2. That is, based on a sidelink UE having the lowest capability in consideration of the capabilities of the sidelink RX UEs, L may be configured for a resource pool that supports PSFCH transmission.

As described above, if L is configured for a resource pool (L≤N), a sidelink RX UE may need to transmit PSFCHs, the number of which is smaller than N, at the point in time at which PSFCH transmission is performed. As another example, a sidelink RX UE may need to transmit PSFCHs, the number of which is smaller than N, at the point in time at which PSFCH transmission is performed, since a PSFCH resource is insufficient. In this instance, an operation of selecting L PSFCHs to transmit from among N candidate PSFCHs. For example, as described above, a PSSCH resource may be in the relationship of being mapped to a PSFCH resource. Each sidelink data transmitted via a PSSCH may have a priority value transferred from a higher layer, and thus, the sidelink RX UE may select, based on priority, L PSFCHs that the UE is to actually transmit from among the N candidate PSFCHs (in this instance, L is a value greater than or equal to 1).

As described above, the sidelink RX UE that selects the number of PSFCHs to be simultaneously transmitted based on the priority and/or the number of PSFCH resources at the point in time at which transmission is performed may set PSFCH transmission power according to at least one of the following methods in operation S1530.

Method 1) determines PSFCH transmission power based on the number (L) of PSFCH to be simultaneously transmitted.

Method 1) may be a method of determining transmission power for L PSFCHs based on Equation 8 below.

$$P_{PSFCH}=\min\{P_{CMAX,L}, 10 \log_{10}(2^\mu \times M \times L)+P_{0\_PSFCH}+\alpha_{PSFCH} \times PL\} \text{ [dBm]} \quad \text{[Equation 8]}$$

In Equation 8, $P_{CMAX,L}$ may be the maximum transmission power value allowed for a UE when the UE simultaneously transmits L PSFCHs. Generally, $P_{CMAX}$ may be the maximum transmission power value set for a UE, irrespective of the number of PSFCHs to be transmitted, and thus, it may not be preferable that the maximum transmission power value of a UE varies depending on the number of PSFCHs to be simultaneously transmitted. Therefore, Equation 8 may be improper. As another example, Equation 9 may be considered.

$$P_{PSFCH}=\min\{P_{CMAX}, 10 \log_{10}(2^\mu \times M \times L)+P_{0\_PSFCH}+\alpha_{PSFCH} \times PL\} \text{ [dBm]} \quad \text{[Equation 9]}$$

In Equation 9, the sidelink RX UE that is to simultaneously transmit L PSFCHs may calculate transmission power for L PSFCHs based on Z_dB+10 $\log_{10}(2^\mu \times M \times L)$+$P_{0\_PSFCH}$+$\alpha_{PSFCH} \times PL$. If Z_dB<$P_{CMAX}$, a Z_dB value may be used as transmission power for L PSFCHs. Otherwise, if Z_dB≥$P_{CMAX}$, the UE may evenly scale down (scaling down) the transmission power for L PSFCHs so that a Z_dB value is less than or equal to $P_{CMAX}$.

Particularly, a PSFCH transmission power value set for transmitting a single PSFCH may be defined as X_dB=10 $\log_{10}(2^\mu \times M)$+$P_{0\_PSFCH}$+$\alpha_{PSFCH} \times PL$, and may be expressed as X=10^(X_dB/10). That is, X_dB of a dB scale is modified to X of a linear domain. In this instance, it is defined that Y=L·X, which is L (i.e., transmission of L PSFCHs) times X (a PSFCH transmission power value, set for transmitting a single PSFCH and expressed in a linear domain). Y in the linear domain may be modified to a dB value as below. Y_dB=10 $\log_{10}(Y)$=10 $\log_{10}(L \cdot X)$=10 $\log_{10}(L)$+10 $\log_{10}(X)$=10 $\log_{10}(L)$+X_dB. In this instance, X_dB is defined as X_dB=10 $\log_{10}(2^\mu \times M)$+$P_{0\_PSFCH}$+$\alpha_{PSFCH} \times PL$ and thus, Y_dB may be expressed as 10 $\log_{10}(2^\mu \times M)$+$P_{0\_PSFCH}$+$\alpha_{PSFCH} \times PL$, which is identical to Z_dB defined in advance.

The above-described scaling down may be performed in the linear domain, instead the dB domain. That is, Z_dB may be modified to a value in the linear domain (Z=10^(X_dB/10)), and Pcmax may be modified to a value in the linear domain (10^(Pcmax/10)). In this instance, scaling may be performed by β so that 10^(Pcmax/10)≤β·Z is satisfied, and β has a value in the range of 0≤β≤1.

Method 2) determines transmission power for a single PSFCH, and increasing the transmission power based on the number of PSFCHs to be simultaneously transmitted.

Method 2) may be similar to Method 1) but may have a difference as below. Equation 10 may be considered in order to transmit N PSFCHs.

$$P_{PSFCH-1}=\min\{P_{CMAX}, 10 \log_{10}(2^{\mu\_1} \cdot M_1)+P_{0\_PSFCH-1}+\alpha_{PSFCH-1} \cdot PL_1\} \text{ [dBm]}$$

$$P_{PSFCH-2}=\min\{P_{CMAX}, 10 \log_{10}(2^{\mu\_2} \cdot M_2)+P_{0\_PSFCH-2}+\alpha_{PSFCH-2} \cdot PL_2\} \text{ [dBm]}$$

$$\ldots$$

$$P_{PSFCH-N}=\min\{P_{CMAX}, 10 \log_{10}(2^{\mu\_N} \cdot M_N)+P_{0\_PSFCH-N}+\alpha_{PSFCH-N} \cdot PL_N\} \text{ [dBm]} \quad \text{[Equation 10]}$$

In Equation 10, $P_{PSFCH-N}$ denotes transmission power for an $N^{th}$ PSFCH. $\mu\_N$, $M_N$, $P_{0\_PSFCH-N}$, $\alpha_{PSFCH-N}$, and $PL_N$ denote the subcarrier spacing, the size of a frequency block allocated, $P_0$, α, and a pathloss value of the $N^{th}$ PSFCH, respectively. If N PSFCHs are transmitted to different sidelink TX UEs, at least one of the above-described parameters may be different. That is, a first PSFCH and a second PSFCH may be transmitted to sidelink TX UE-1, and a third PSFCH may be transmitted to sidelink TX UE-2. In this instance, the transmission power value for each PSFCH may be different from each other. In addition, if a plurality of PSFCHs are transmitted to the same TX UE, at least one of the above-described parameters may have a different value according to configuration by the base station or the like.

If the sidelink RX UE needs to simultaneously transmit L PSFCHs among the N PSFCHs to the same TX UE or different TX UEs, the transmission power value for each PSFCH needs to be set to an identical value. The reason for this is that, if the transmission power values for PSFCHs transmitted on the same symbol are different, interference may be caused to the transmitted PSFCHs due to imbalance of the transmission power values for the PSFCHs. To this end, at least one of the following operations may be considered.

Method 2-A) calculates the transmission power value for each of the L PSFCHs based on Equation 10, and may perform scaling down or scaling up based on the transmission power value for a PSFCH having the highest priority so that the transmission power values for the remaining PSFCHs are identical. In this instance, an operation associated with scaling down or scaling up may be performed in the linear domain as described above.

Method 2-B) calculates the transmission power value for each of L PSFCHs based on Equation 10, and unlike method 2-A), may perform scaling up based on a PSFCH having the highest transmission power value, irrespective of priority, so that the transmission power values of the remaining PSFCHs are identical. Alternatively, scaling down may be performed based on a PSFCH having the lowest transmission power value so that the transmission power values of the remaining PSFCHs are identical. In this instance, an operation associated with scaling down or scaling up may be performed in the linear domain as described above.

If the transmission power value for each of L PSFCHs to be simultaneously transmitted is calculated according to the above-described methods 2-A and 2-B, and the transmission power value for each of L PSFCHs is maintained identically, the sidelink RX UE may calculate the transmission power value for L PSFCHs based on Equation 9. In this instance, as described above, transmission power for L PSFCHs may be calculated based on $Z\_dB = 10 \log_{10}(2^{\mu} \cdot M \cdot L) + P_{0\_PSFCH} + \alpha_{PSFCH} \cdot PL$. If $Z\_dB < P_{CMAX}$, a $Z\_dB$ value may be used as transmission power for L PSFCHs. Otherwise, if $Z\_dB \geq P_{CMAX}$, the UE may perform additional scaling down so that the transmission power values for L PSFCHs are maintained identically and the $Z\_dB$ value is less than or equal to $P_{CMAX}$.

The UE that determines PSFCH transmission power based on at least one of the above-described methods for setting PSFCH transmission power may transmit a PSFCH using the corresponding transmission power in operation S1535.

Based on the above-described discussion, the disclosure relates to a method and apparatus for controlling transmission power for a sidelink synchronization channel in a wireless communication system. The method of controlling transmission power for a sidelink synchronization channel in a wireless communication system according to an embodiment may include: an operation of receiving, from a base station, a parameter associated with control of transmission power for a sidelink synchronization channel, an operation of determining the transmission power value for the sidelink synchronization channel based on the parameter; and an operation of transmitting the sidelink synchronization channel based on the set transmission power. In addition, the disclosure relates to a method and apparatus for controlling transmission power for a sidelink feedback channel in a wireless communication system. The method of controlling transmission power for a sidelink feedback channel in a wireless communication system according to an embodiment may include: an operation of receiving, from a base station, a parameter associated with control of transmission power for a sidelink feedback channel, an operation of determining the transmission power value for the sidelink feedback channel based on the parameter; and an operation of transmitting the sidelink feedback channel based on the set transmission power.

Figure 16:
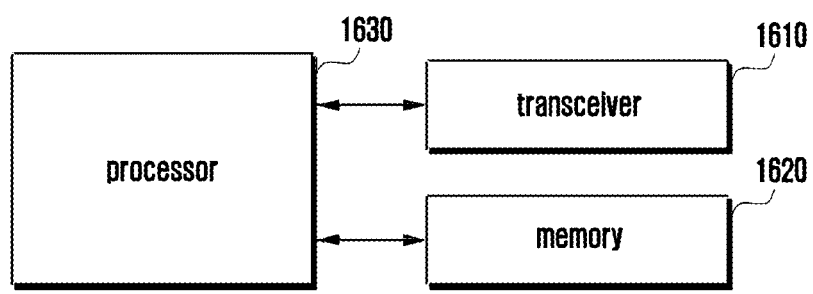
FIG. 16 is a block diagram illustrating the structure of a transmission (TX) UE according to an embodiment of the disclosure.

FIG. 16 is a block diagram illustrating the structure of a transmission (TX) UE according to an embodiment of the disclosure.

As illustrated in FIG. 16, the TX UE of the disclosure may include a transceiver 1610, a memory 1620, and a processor 1630. According to above-described communication method of the TX UE, the processor 1630, the transceiver 1610, and the memory 1620 of the TX UE may operate. However, the elements of the TX UE are not limited to the above-descried example. For example, the TX UE may include more or fewer elements than the above-described elements. In addition, the processor 1630, the transceiver 1610, and the memory 1620 may be implemented as a single chip. In addition, the processor 1630 may include one or more processors.

The transceiver 1610 is the common name of a receiver and a transmitter of the TX UE, and may perform transmission or reception of a signal with a base station. The signal transmitted or received may include control information and data. To this end, the transceiver 1610 may include an RF transmitter that up-converts and amplifies the frequency of a transmitted signal, an RF receiver that low-noise amplifies a received signal and down-converts the frequency of the signal, and the like. This is merely an example of the transceiver 1610, and the elements of the transceiver 1610 are not limited to an RF transmitter and an RF receiver.

In addition, the transceiver 1610 may receive a signal via a wireless channel and output the same to the processor 1630, and may transmit a signal output from the processor 1630 via a wireless channel.

The memory 1620 may store a program and data needed when the TX UE operates. In addition, the memory 1620 may store control information or data included in a signal obtained by the TX UE. The memory 1620 may be implemented as a storage medium such as ROM, RAM, hard disk, CD-ROM, DVD, and the like, or a combination of storage media.

The processor 1630 may control a series of processes such that the TX UE operates according to the above-described embodiments of the disclosure. For example, the processor 1630 may control the elements of the TX UE so as to implement the method of setting transmission power for a sidelink synchronization channel and a sidelink feedback channel according to an embodiment of the disclosure. For example, the transceiver 1610 may receive a data signal including a control signal, and the processor 1630 may determine a reception result associated with the data signal.

Figure 17:
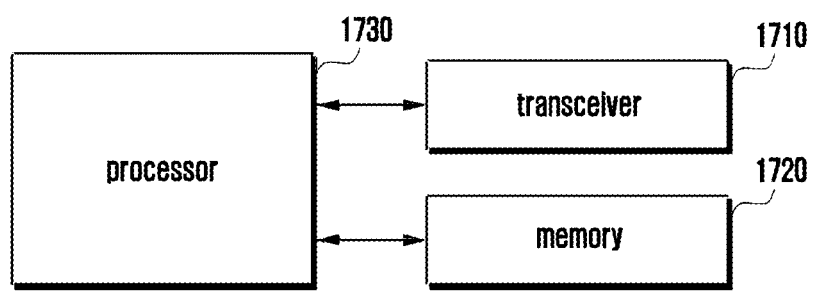
FIG. 17 is a block diagram illustrating the structure of a reception (RX) UE according to an embodiment of the disclosure.

FIG. 17 is a block diagram illustrating the structure of a reception (RX) UE according to an embodiment of the disclosure.

As illustrated in FIG. 17, the RX UE of the disclosure may include a transceiver 1710, a memory 1720, and a processor 1730. According to above-described communication method of the RX UE, the processor 1730, the transceiver 1710, and the memory 1720 of the RX UE may operate. However, the elements of the RX UE is not limited to the above-descried example. For example, the RX UE may include more or fewer elements than the above-described elements. In addition, the processor 1730, the transceiver 1710, and the memory 1720 may be implemented as a single chip. In addition, the processor 1730 may include at least one processor.

The transceiver 1710 is the common name of a receiver and a transmitter of the RX UE, and may perform transmission or reception of a signal with a base station. The signal transmitted or received may include control information and data. To this end, the transceiver 1710 may include an RF transmitter that up-converts and amplifies the frequency of a transmitted signal, an RF receiver that low-noise amplifies a received signal and down-converts the frequency of the signal, and the like. This is merely an example of the transceiver 1710, and the elements of the transceiver 1710 are not limited to an RF transmitter and an RF receiver.

In addition, the transceiver 1710 may receive a signal via a wireless channel and output the same to the processor 1730, and may transmit a signal output from the processor 1730 via a wireless channel.

The memory 1720 may store a program and data needed when the RX UE operates. In addition, the memory 1720 may store control information or data included in a signal obtained by the RX UE. The memory 1720 may be implemented as a storage medium such as ROM, RAM, hard disk, CD-ROM, DVD, and the like, or a combination of storage media.

The processor 1730 may control a series of processes such that the RX UE operates according to the above-described embodiments of the disclosure. For example, the processor 1730 may control the elements of the RX UE so as to implement the method of setting transmission power for a sidelink synchronization channel and a sidelink feedback channel according to an embodiment of the disclosure. For example, the transceiver 1710 may receive a data signal including a control signal, and the processor 1730 may determine a reception result associated with the data signal.

Figure 18:
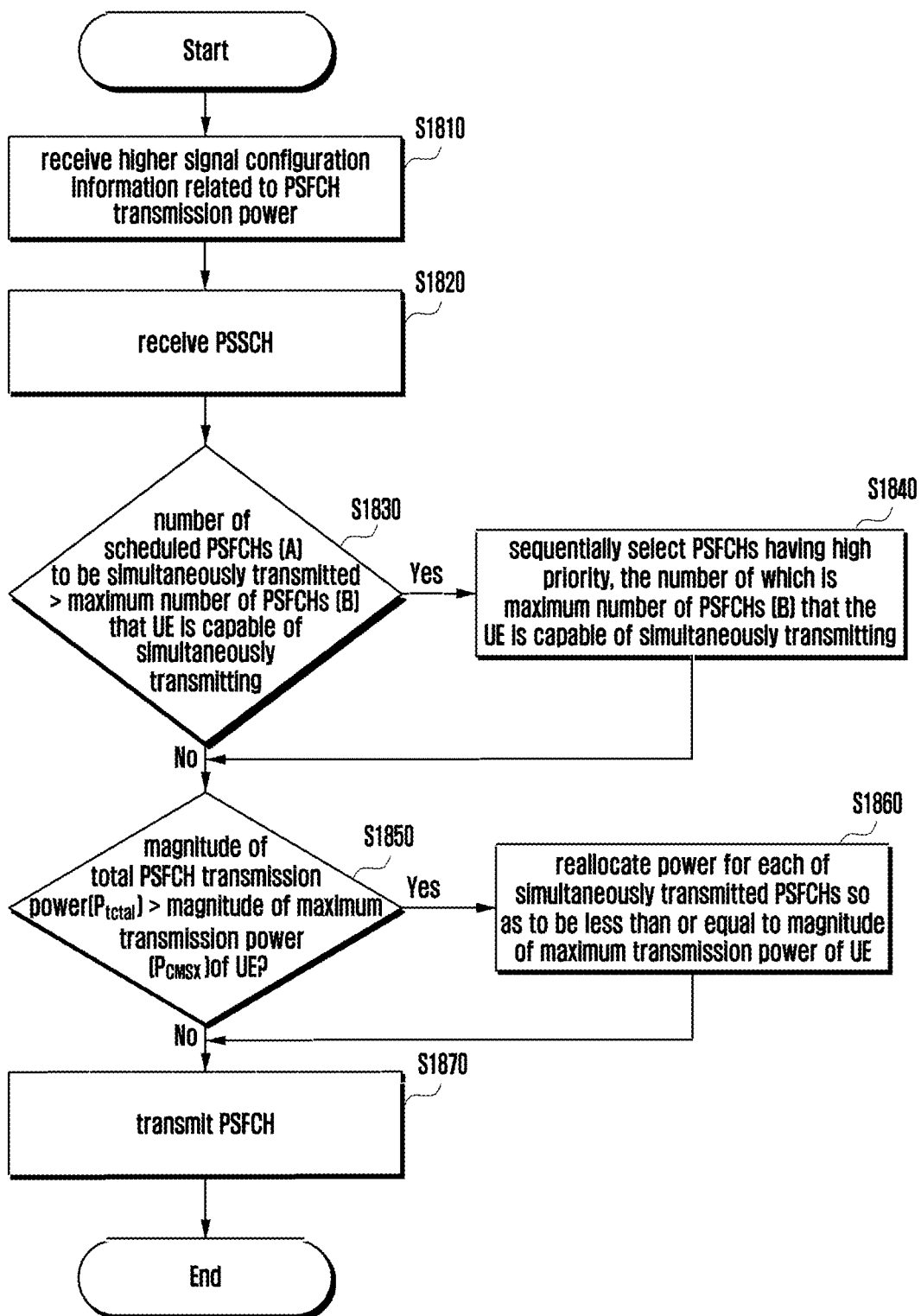
FIG. 18 is a flowchart illustrating an example of a transmission power determining method when a single sidelink RX UE transmits a plurality of sidelink feedback channels according to an embodiment of the disclosure.

FIG. 18 is a flowchart illustrating an example of a transmission power determining method when a single sidelink RX UE transmits a plurality of sidelink feedback channels according to an embodiment of the disclosure.

If a single sidelink RX UE transmits a $k^{th}$ sidelink feedback channel at a transmission point i, transmission power ($P_{PSFCH,k}(i)$) for a PSFCH may be determined based on Equation 11 below.

$$P_{PSFCH,k}(i) = \min\{P_{CMAX}, 10\ \log_{10}(2^{\mu} \cdot M) + P_{0\_PSFCH} + \alpha_{PSFCH} \cdot PL\}\ [dBm] \quad \text{[Equation 11]}$$

In Equation 11, if the size of a frequency block used for transmitting a single PSFCH is 1, M may be omitted (i.e., M=1). In addition, in Equation 11, a pathloss value (PL) may be a downlink pathloss value. In this instance, as illustrated in FIGS. 10 to 13, a sidelink RX UE that is to transmit a PSFCH may estimate a downlink pathloss value based on an SSB, an SSB and a DMRS of a PBCH, or a CSI-RS transmitted by the base station. In this instance, $P_{0\_PSFCH}$ may be $P_{0\_DL\_PSFCH}$, and $\alpha_{PSFCH}$ may be $\alpha_{DL\_PSFCH}$.

If the sidelink RX UE that transmits a PSFCH is outside the coverage area of the base station, $\alpha_{PSFCH}=1$ is preconfigured in Equation 11 (pre-configuration). That is, if the sidelink RX UE is outside the coverage area of the base station, transmission power for the PSFCH may be determined by $\min\{P_{CMAX}, 10\ \log_{10}(2^{\mu} \cdot M) + P_{0\_PSFCH}\}$. As another example, if the sidelink RX UE is outside the coverage area of the base station, transmission power for the PSFCH may be fixed to a predetermined value, as opposed to be determined based on an equation (e.g., Equation 11). As another example, $P_{0\_PSFCH}$ is information set by a higher signal, but if a higher signal is not present, $P_{PSFCH,k}(i) = P_{CMAX}$ or $P_{PSFCH}(i) = P_{CMAX}$. $P_{PSFCH}(i)$ is transmission power for a PSFCH when a single sidelink feedback channel or a plurality of sidelink feedback channels is transmitted at a transmission point i, $\alpha_{PSFCH}$ is information set by a higher signal, but it is regarded that $\alpha_{PSFCH}=1$ if a higher signal is not present. μ is a value indicating the subcarrier spacing of a sidelink channel. There is a relationship in that μ=0 at 15 kHz, μ=1 at 30 kHz, μ=2 at 60 kHz, and μ=3 at 120 kHz, and it may be expressed as a subcarrier spacing of $15 \cdot 2^{\mu}$ kHz based on μ.

As illustrated in FIG. 18, the UE may receive higher signal configuration information related to PSFCH transmission in operation S1810 and may receive a PSSCH in operation S1820, and may determine a PSFCH transmission resource based on a PSSCH frequency resource (e.g., a starting sub-channel index at which reception of the PSSCH starts) and a PSSCH time resource (e.g., a slot index at which the PSSCH is received). In addition, if a UE receives only a single PSSCH, the UE may transmit a single PSFCH. If a UE receives a plurality of PSSCHs, the UE may transmit a plurality of PSFCHs. If the number of PFSCHs that the UE is capable of simultaneously transmitting is B, the value of B may be configured by a UE-common higher signal or a UE-specific higher signal, or may be determined based on UE capability reported by the RX UE. If the number of PSFCHs that the RX UE is to simultaneously transmit at a predetermined point i according to scheduling is A, the UE may compare A and B so as to determine the number of PSFCHs to be transmitted, in operation S1830. If A is greater than B, since the RX UE is capable of transmitting as many PSFCHs as the maximum number (B) of PSFCHs capable of being simultaneously transmitted, the RX UE may sequentially select B PSFCHs in order of priority and determine to transmit the same in operation S1840. The priority information may be indicated by a PSCCH that schedules a PSFCH or may be determined by a resource location or cast information. Alternatively, in the case in which a PSFCH needs to be selected among PSFCHs having the same priority, the RX UE may randomly select a PSFCH or may select a PSFCH having a low index or a high index from the perspective of frequency. If the number of PSFCHs that the RX UE is to simultaneously transmit at a predetermined point i according to scheduling is A, and A is less than or equal to B, the RX UE may determine to transmit min(A,B) PSFCHs at the predetermined point i. Before transmitting the determined number of PSFCHs, the RX UE may determine transmission power allocated for each PSFCH based on Equation 11.

If the magnitude of the total transmission power ($P_{total}$) allocated for min(A,B) PSFCHs is greater than the maximum transmission power ($P_{CMAX}$) of the RX UE, the RX UE may not be capable of transmitting the determined number of PSFCHs at the transmission power determined based on Equation 11. Therefore, the UE may transmit the PSFCHs at power within the maximum transmission power ($P_{CMAX}$) of the RX UE according to at least one of the following two methods in operation S1860.

Method 18-1: performs additional scaling down on transmission power for each of min(A,B) PSFCHs (scaling down transmission power control)

Method 18-2: controls the number (C) of PSFCHs to be simultaneously transmitted so that C is less than min (A,B) (C<min(A,B))

The above-described magnitude of total transmission power ($P_{total}$) [dBm] may be the sum of transmission power allocated for respective PSFCHs, and may be defined as $$10 \cdot \log_{10}\left[\sum_{k}^{min(A,B)} 10^{\frac{P_{PSFCH,k}(i)}{10}}\right].$$

Particularly, according to method 18-1, in the case in which the magnitude of the total transmission power ($P_{total}$) for PSFCH transmission by the RX UE exceeds $P_{CMAX}$ (i.e., if $P_{total}>P_{CMAX}$ in expression), if a single sidelink RX UE transmits a $k^{th}$ sidelink feedback channel at a transmission point i, the transmission power $P_{PSFCH,k}(i)$ for a PSFCH may be determined based on Equation 12 below.

$$P_{PSFCH,k}(i) = P_{CMAX} - 10 \cdot \log_{10}[(min(A, B)] \; [dBm] \quad \text{[Equation 12]}$$

or $$10 \cdot \log_{10}\left[10^{\frac{P_{CMAX}/min(A,B)}{10}}\right] \; [dBm]$$

Alternatively, the RX UE may reallocate the transmission power for the sidelink feedback channel so that the transmission power for the $K^{th}$ sidelink feedback channel at the transmission point i is less than or equal to the maximum transmission power of the RX UE. Therefore, method 18-1 may provide a method in which the RX UE evenly reallocate transmission power for each PSFCH so that the total PSFCH transmission power is less than or equal to the maximum transmission power of the UE.

Particularly, according to the method 18-2, if the total transmission power ($P_{total}$) of the RX UE for PSFCH transmission exceeds $P_{CMAX}$ (if $P_{total}>P_{CMAX}$ in expression), the RX UE may transmit C PSFCHs from the lowest (or highest) priority information value indicated by SCI formats (or PSSCHs) related to min(A,B) PSFCHs which are to be transmitted at the transmission point i. In this instance, C is the maximum value among C values that satisfy Equation 13 below. Therefore, method 18-2 may reallocate transmission power for each PSFCH as described in method 18-1, but the RX UE may determine transmission power for some PSFCHs to 0 and may maintain transmission power for the remaining PSFCHs so that the total PSFCH transmission power becomes less than or equal to the maximum transmission power. Therefore, in the case of a PSFCH for which transmission power is determined to 0, the UE may not transmit the corresponding PSFCH.

$$10 \cdot \log_{10}\left[\sum_{k}^{C} 10^{\frac{P_{PSFCH,k}(i)}{10}}\right] \le P_{CMAX} \; [dBm] \quad \text{[Equation 13]}$$

As illustrated in FIG. 18, the RX UE may determine PSFCHs to be transmitted at the predetermined point i and transmission power for the PSFCHs in consideration of the maximum transmission power according to method 18-1 or 18-2, and may transmit the PSFCHs in operation S1870. In addition, if the magnitude of the total transmission power ($P_{total}$) allocated for min(A,B) PSFCHs of the RX UE is less than or equal to the maximum transmission power ($P_{CMAX}$) of the RX UE, the UE may transmit the PSFCHs at the predetermined point i using the transmission power determined based on Equation 11 in operation S1870.

According to an embodiment of FIG. 18, the RX UE may transmit a PSFCH associated with a PSCCH/PSSCH by taking into consideration the maximum number of PSFCHs that the RX UE is capable of transmitting at the predetermined point i and the PSFCH maximum transmission power, sequentially.

Method 18-1 and method 18-2 may be performed in combination depending on an embodiment, and the RX UE may determine transmission power for each PSFCH. For example, if the RX UE is capable of transmitting not all the determined PSFCHs with the transmission power determined based on Equation 11, since the magnitude of total transmission power ($P_{total}$) allocated for min(A,B) PSFCHs is greater than the maximum transmission power ($P_{CMAX}$) of the RX UE, the RX UE may adjust the number of PSFCHs to be simultaneously transmitted as described in method 18-1 and method 18-2. For example, the RX UE may identify C PSFCHs from the lowest priority value (or highest priority value) indicated by SCI formats (or PSSCHs) related to PSFCHs to be transmitted at the transmission point i. In this instance, C may be the maximum value of the number of PSFCHs which enables the magnitude of the total transmission power allocated for the PSFCHs to be less than or equal to the maximum transmission power of the RX UE. The RX UE may determine to simultaneously transmit C or more PSFCHs. In this instance, the RX UE may determine the smallest value between transmission power which is determined by evenly allocating the maximum transmission power of the RX UE based on the number of PSFCHs to be simultaneously transmitted, and predetermined transmission power for each PSFCH (e.g., transmission power for each PSFCH allocated at the initial stage or transmission power determined based on Equation 11) to be the transmission power for each of the PSFCHs to be simultaneously transmitted. For example, min(A,B) of Equation 12 may be replaced with the number of PSFCHs that the RX UE determines to simultaneously transmit. Accordingly, between transmission power determined based on the above and the predetermined transmission power for each PSFCH (e.g., transmission power for each PSFCH allocated at the initial stage or transmission power determined based on Equation 11), the smallest value may be determined to be the transmission power for each of PSFCHs to be simultaneously transmitted.

Figure 19:
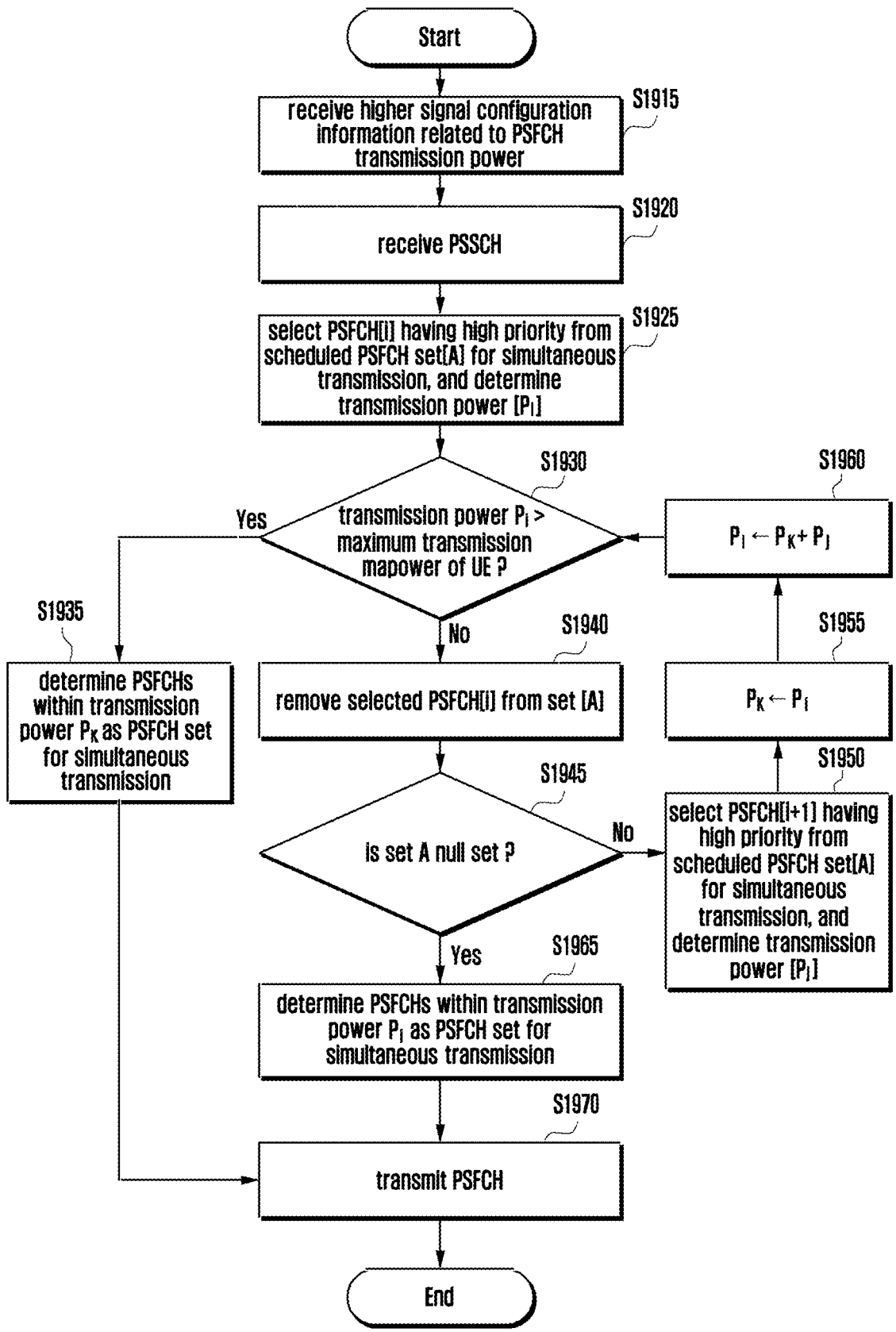
FIG. 19 is a flowchart illustrating an example of a transmission power determining method when a single sidelink RX UE transmits a plurality of sidelink feedback channels according to an embodiment of the disclosure.

FIG. 19 is a flowchart illustrating an example of a transmission power determining method when a single sidelink RX UE transmits a plurality of sidelink feedback channels according to an embodiment of the disclosure.

In FIG. 18, the maximum number of PFSCHs (B) that the RX UE is capable of simultaneously transmitting at a predetermined point i is set by a UE-common higher signal or a UE-specific higher signal, or is a value determined based on UE capability reported by the RX UE. In FIG. 19, the maximum number of PFSCHs (B) that the UE is capable of simultaneously transmitting at a predetermined point i is a value determined based on the magnitude of maximum power ($P_{CMAX}$) that the UE is capable of transmitting at the point i. Therefore, B in FIG. 18 is a value determined based on a higher signal or UE capability, but B in FIG. 19 is a value determined by transmission power allocated for each PSFCH and the maximum transmission power $P_{CMAX}$ of the UE.

According to an embodiment, if the RX UE transmits A PSFCHs at a predetermined PSFCH transmission point i, the RX UE may transmit min(A,B) PSFCHs that satisfy all the following conditions.

Condition 19-1: The min(A,B) PSFCHs may be determined based on priority information indicated by SCI formats or PSSCHs related to PSFCHs. For example, a PSFCH indicated by an SCI format having a low priority value may be preferentially transmitted.

Condition 19-2: B may be the maximum value that satisfies Equation 14 below. Alternatively, B may be a value determined based on Equation 15.

$$10 \cdot \log_{10}\left[\sum_{k}^{B} 10^{\frac{P_{PSFCH,k}(i)}{10}}\right] \leq P_{CMAX} \qquad \text{[Equation 14]}$$

$$\operatorname*{argmax}_{N}\left\{\left[10 \cdot \log 10 \sum_{k}^{B} 10^{\frac{P_{PSFCH,k}(i)}{10}}\right] \leq P_{CMAX}\right\} \qquad \text{[Equation 15]}$$

As an example of condition 19-1, in the case in which PSFCH-1, PSFCH-2, and PSFCH-3 are scheduled and their priority values are 0, 1, and 2, respectively, if the maximum number of PSFCHs that the RX UE is capable of simultaneously transmitting is 2, the RX UE may simultaneously transmit PSFCH-1 and PSFCH-2 having low priority values, and may not transmit PSFCH-3.

FIG. 19 is a flowchart illustrating a simultaneous PSFCH transmission process of an RX UE in consideration of condition 19-1 and condition 19-2, according to an embodiment. In FIG. 19, although $P_i$ or $P_j$ is determined based on Equation 11, and a value converted into a value in mW, instead of dBm, may be considered. The relationship between dBm and mW may be defined by Equation 16.

$$\text{dBm} = 10 \log_{10}(\text{mW}), \quad \text{mW} = 10^{mW/10} \qquad \text{[Equation 16]}$$

The UE may be configured with PSFCH related information via a higher signal as described in FIGS. 15 to 18, in operation S1915, and may receive a single PSSCH or a plurality of PSSCHs in operation S1920. The UE may sequentially select PSFCHs having high priority based on the priority values of the received PSSCHs in operation S1925. If it is assumed that PSFCHs having high priority at a predetermined PSFCH transmission point i are PSFCH-1, PSFCH-2, PSFCH-3, . . . , PSFCH-k, . . . , the RX UE may sequentially add a PSFCH one by one to a PSFCH_set which is a set of PSFCHs to be simultaneously transmitted, within a range that does not exceed the maximum transmission power $P_{CMAX}$. For example, if it is assumed that, at the PSFCH transmission point i, the transmission power for PSFCH-1 is $P_{PSFCH,1}(i)$, the transmission power for PSFCH-2 is $P_{PSFCH,2}(i)$, the transmission power for PSFCH-3 is $P_{PSFCH,3}(i)$, . . . , the transmission power for PSFCH-k $P_{PSFCH,k}(i)$, . . . , and so on, PSFCH transmission may be performed based on [pseudo code 1] as follows. In [pseudo code 1] below, $P_{PSFCH,k}(i)$ and $P_{CMAX}$ are values converted into values in milliwatts (mW), instead of dBm.

```
[pseudo code 1 start]
    Set PSFCH_set = ϕ (null set) -> the number of PSFCHs to be simultaneously transmitted
    Set A = {P_PSFCH,1(i), P_PSFCH,2(i),... , P_PSFCH,k(i), ..., P_PSFCH,A(i)} →
    a set of scheduled PSFCHs which are aligned in order of priority (a lower k value
    denotes a higher priority), and expressed in transmission power (mW)
    P_total = P_PSFCH,1(i);
    A = A\P_PSFCH,1(i);
    k = 1;
    PSFCH_set = PSFCH_set ∪ P_PSFCH,1(i);
    While {A ≠ ϕ} and {P_total < P_CMAX}
        k = k+1;
        P_total = P_total + P_PSFCH,k(i);
        A = A\P_PSFCH,k(i);
        PSFCH_set = PSFCH_set ∪ P_PSFCH,k(i);
    end while
[pseudo code 1 end]
```

In [pseudo code 1], "\" is a symbol indicating a relative complement, and X\Y denotes a set of elements remaining after excluding set Y or elements of set Y from set X. The UE may determine PSFCH_set based on [pseudo code 1] in operation S1965, and may transmit a PSFCH included in the PSFCH_set in operation S1970.

In FIG. 19, B is a value determined based on the transmission power allocated for each PSFCH and the maximum transmission power $P_{CMAX}$ of the UE. In [pseudo code 1], the magnitude of PSFCH_set may be considered as B, and the corresponding PSFCH_set may be determined based on $P_{CMAX}$ or set A. Particularly, every time that the RX UE adds a PSFCH in order to determine PSFCHs to be simultaneously transmitted, the RX UE may perform a process of identifying whether the magnitude of total transmission power for PSFCHs exceeds the maximum transmission power $P_{CMAX}$ of the UE according to the description with reference to FIG. 19 or [pseudo code 1] in operation S1930. The RX UE may determine PSFCHs to be simultaneously transmitted at transmission power that does not exceeds the maximum transmission power $P_{CMAX}$ in operation 1935, and may transmit the corresponding PSFCHs in operation S1970.

As another example, the UE may determine PSFCHs to be transmitted at a predetermined point i in consideration both the maximum transmission power of the UE and the maximum number of PSFCHs that the UE is capable of simultaneously transmitting according to the flowchart of FIG. 19, in addition to [pseudo code 1], and may perform transmission.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device. In the disclosure, the term "computer program product" or "computer readable medium" are used to generally indicate media such as a memory, a hard disk installed in a hard disk drive, a signal, and the like. The "computer program product" or "computer readable medium" are units provided for the method of configuring transmission power for a sidelink synchronization channel and a sidelink feedback channel.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, the embodiments of the disclosure described and shown in the specification and the drawings have been presented to easily explain the technical contents of the disclosure and help understanding of the disclosure, and are not intended to limit the scope of the disclosure. It will be apparent to those skilled in the art that other variants based on the technical idea of the embodiments may be implemented. The respective embodiments may be employed in combination, as necessary, without departing from the essence of the disclosure. For example, one embodiment of the disclosure may be combined with parts of other embodiments. Further, other variants of the above-described embodiments, based on the technical idea of the embodiments, may be implemented in other systems such as LTE, 5G, and NR systems.

The invention claimed is:

1. A method of a first user equipment (UE) in a communication system, the method comprising:
    receiving, from a base station, configuration information associated with power control for transmission of a physical sidelink feedback channel (PSFCH);
    receiving a plurality of physical sidelink shared channels (PSSCHs) scheduled based on a plurality of sidelink control information (SCI);
    identifying whether a number of scheduled PSFCHs that are scheduled as a response to reception of the plurality of PSSCHs is less than or equal to a maximum number of PSFCHs that the first UE is capable of transmitting;
    based on identifying that the number of the scheduled PSFCHs is less than or equal to the maximum number of the PSFCHs, in case that a value associated with sum operation using transmission power for a single PSFCH and the number of the scheduled PSFCHs is greater than a maximum transmission power, identifying at least one PSFCH to be transmitted simultaneously in order of priority, wherein information on priority is indicated by at least one SCI associated with the at least one PSFCH,
    wherein a number of the at least one PSFCH to be transmitted simultaneously is identified based on a largest value satisfying a condition, and
    wherein the condition is satisfied in case that a value associated with sum operation using the transmission power for the single PSFCH and a number of PSFCHs is less than or equal to the maximum transmission power;
based on identifying that the number of the scheduled PSFCHs is greater than the maximum number of the PSFCHs, in case that a value associated with sum operation using the transmission power for the single PSFCH and the maximum number of the PSFCHs is greater than the maximum transmission power, identifying the at least one PSFCH to be transmitted simultaneously in order of priority,
wherein the number of the at least one PSFCH to be transmitted simultaneously is identified based on the largest value satisfying the condition;
identifying first transmission power for the at least one PSFCH based on the number of the at least one PSFCH; and
transmitting the at least one PSFCH based on the first transmission power.

2. The method of claim 1, further comprising:
based on identifying that the number of the scheduled PSFCHs is less than or equal to the maximum number of the PSFCHs, in case that the value associated with the sum operation using the transmission power for the single PSFCH and the number of the scheduled PSFCHs is less than or equal to the maximum transmission power, identifying second transmission power for the scheduled PSFCHs based on the configuration information; and
transmitting the scheduled PSFCHs based on the second transmission power.

3. The method of claim 1, further comprising: based on identifying that the number of the scheduled PSFCHs is greater than the maximum number of the PSFCHs, in case that the value associated with the sum operation using the transmission power for the single PSFCH and the maximum number of the PSFCHs is less than or equal to the maximum transmission power, identifying second transmission power for the PSFCHs corresponding to the maximum number based on the configuration information; and
transmitting the PSFCHs based on the second transmission power.

4. The method of claim 1, wherein the first transmission power for the at least one PSFCH is set to a same value.

5. The method of claim 1, wherein the configuration information includes at least one of a first value and a second value which are used for identifying transmission power for the single PSFCH.

6. The method of claim 5,
wherein the transmission power for the single PSFCH is identified based on the first value, the second value, and a downlink pathloss value, and
wherein the downlink pathloss value is based on a measurement result associated with a signal received from the base station.

7. The method of claim 1, wherein the first transmission power for the at least one PSFCH is identified based on the maximum transmission power and the number of the at least one PSFCH.

8. A first user equipment (UE) of a communication system, the first UE comprising:
a transceiver; and
a controller coupled with the transceiver and configured to:
receive, from a base station, configuration information associated with power control for transmission of a physical sidelink feedback channel (PSFCH),
receive a plurality of physical sidelink shared channels (PSSCHs) scheduled based on a plurality of sidelink control information (SCI),
identify whether a number of scheduled PSFCHs that are scheduled as a response to reception of the plurality of PSSCHs is less than or equal to a maximum number of PSFCHs that the first UE is capable of transmitting,
based on identifying that the number of the scheduled PSFCHs is less than or equal to the maximum number of the PSFCHs, in case that a value associated with sum operation using transmission power for a single PSFCH and the number of the scheduled PSFCHs is greater than a maximum transmission power, identify at least one PSFCH to be transmitted simultaneously in order of priority, wherein information on priority is indicated by at least one SCI associated with the at least one PSFCH,
wherein a number of the at least one PSFCH to be transmitted simultaneously is identified based on a largest value satisfying a condition, and
wherein the condition is satisfied in case that a value associated with sum operation using the transmission power for the single PSFCH and a number of PSFCHs is less than or equal to the maximum transmission power,
based on identifying that the number of the scheduled PSFCHs is greater than the maximum number of the PSFCHs, in case that a value associated with sum operation using the transmission power for the single PSFCH and the maximum number of the PSFCHs is greater than the maximum transmission power, identify the at least one PSFCH to be transmitted simultaneously in order of priority,
wherein the number of the at least one PSFCH to be transmitted simultaneously is identified based on the largest value satisfying the condition,
identify first transmission power for the at least one PSFCH based on the number of the at least one PSFCH, and
transmit the at least one PSFCH based on the first transmission power.

9. The first UE of claim 8, wherein the controller is configured to:
based on identifying that the number of the scheduled PSFCHs is less than or equal to the maximum number of the PSFCHs, in case that the value associated with the sum operation using the transmission power for the single PSFCH and the number of the scheduled PSFCHs is less than or equal to the maximum transmission power, identify second transmission power for the scheduled PSFCHs based on the configuration information, and
transmit the scheduled PSFCHs based on the second transmission power.

10. The first UE of claim 8, wherein the controller is configured to:
based on identifying that the number of the scheduled PSFCHs is greater than the maximum number of the PSFCHs, in case that the value associated with the sum operation using the transmission power for the single PSFCH and the maximum number of the PSFCHs is less than or equal to the maximum transmission power, identify second transmission power for the PSFCHs corresponding to the maximum number based on the configuration information, and
transmit the PSFCHs based on the second transmission power.

11. The first UE of claim 8, wherein the first transmission power for the at least one PSFCH is set to a same value.

12. The first UE of claim 8, wherein the configuration information includes at least one of a first value and a second value which are used for identifying transmission power for the single PSFCH.

13. The first UE of claim 12,
  wherein the transmission power for the single PSFCH is identified based on the first value, the second value, and a downlink pathloss value, and
  wherein the downlink pathloss value is based on a measurement result associated with a signal received from the base station.

14. The first UE of claim 8, wherein the first transmission power for the at least one PSFCH is identified based on the maximum transmission power and the number of the at least one PSFCH.

\* \* \* \* \*